US008970198B2

(12) United States Patent
Huber et al.

(10) Patent No.: US 8,970,198 B2
(45) Date of Patent: *Mar. 3, 2015

(54) SWITCH-MODE POWER SUPPLY HAVING REDUCED AUDIBLE NOISE

(71) Applicant: Delta Electronics, Inc., Taipei (TW)

(72) Inventors: Laszlo Huber, Cary, NC (US); Milan Jovanovic, Cary, NC (US); Chien-Chung Chang, Taoyuan (TW)

(73) Assignee: Delta Electronics Inc., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/855,482

(22) Filed: Apr. 2, 2013

(65) Prior Publication Data

US 2013/0293206 A1 Nov. 7, 2013

Related U.S. Application Data

(63) Continuation of application No. 12/689,556, filed on Jan. 19, 2010, now Pat. No. 8,410,768.

(51) Int. Cl.
*G05F 1/00* (2006.01)
*H02M 3/158* (2006.01)
*H02M 3/156* (2006.01)

(52) U.S. Cl.
CPC .............. *H02M 3/158* (2013.01); *H02M 3/156* (2013.01)
USPC .......................................... 323/284

(58) Field of Classification Search
USPC ......... 323/282, 284, 285, 286; 363/16, 21.12, 363/95, 97, 131
See application file for complete search history.

(56) References Cited

U.S. PATENT DOCUMENTS

| | | |
|---|---|---|
| 5,229,707 A | 7/1993 | Szepesi et al. |
| 6,034,513 A | 3/2000 | Farrington et al. |
| 6,477,066 B2 | 11/2002 | L'Hermite |
| 6,525,514 B1 | 2/2003 | Balakrishnan et al. |
| 6,538,418 B2 | 3/2003 | Miyazaki |
| 6,781,356 B1 | 8/2004 | Yang et al. |
| 6,856,119 B2 | 2/2005 | Crawford |
| 7,109,693 B2 | 9/2006 | Yoshida et al. |
| 7,202,609 B2 | 4/2007 | Langeslag et al. |
| 7,417,879 B2 | 8/2008 | Sawtell |
| 7,482,788 B2 | 1/2009 | Yang |
| 7,518,885 B2 | 4/2009 | Baurle et al. |
| 7,652,461 B2 | 1/2010 | Tateishi |

(Continued)

OTHER PUBLICATIONS

Weisner, B et al., "Relevance of magnetostriction and forces for the generation of audible noise of transformers cores", IEEE Trans. Magnetics, vol. 36, No. 5, Sep. 2000.

*Primary Examiner* — Adolf Berhane
*Assistant Examiner* — Afework Demisse
(74) *Attorney, Agent, or Firm* — Vector IP Law Group; Robert S. Babayi

(57) ABSTRACT

A power supply having an input and an output, includes a power converter coupled between the input and output of the power supply including at least one switch that is controlled by comparing a sensed voltage, the sensed voltage corresponding to a current flowing through the switch, to a reference voltage. A controller, in response to a change detected in a switching frequency of the switch, reduces audible noise generated by the power supply by at least one of: adjusting the reference voltage; adjusting the current sense voltage; or adjusting a resistance used to generate the sensed voltage.

17 Claims, 25 Drawing Sheets

(56) References Cited

U.S. PATENT DOCUMENTS

| | | |
|---|---|---|
| 7,696,737 B2 | 4/2010 | Polivka |
| 7,719,251 B2 | 5/2010 | Qahouq et al. |
| 7,791,326 B2 | 9/2010 | Dahlman et al. |
| 8,184,459 B2 | 5/2012 | Fujii |
| 8,410,768 B2 * | 4/2013 | Huber et al. ............ 323/284 |
| 2006/0171179 A1 | 8/2006 | Hall et al. |
| 2009/0066308 A1 | 3/2009 | Fogg et al. |
| 2011/0175584 A1 * | 7/2011 | Huber et al. ............ 323/282 |

* cited by examiner (a)

(b)

SWITCH-MODE POWER SUPPLY HAVING REDUCED AUDIBLE NOISE

CROSS REFERENCE TO RELATED APPLICATIONS

This Non-provisional application is a continuation of Non-provisional application Ser. No. 12/689,586 filed Jan. 19, 2010, titled "Switch-Mode Power Supply Having Reduced Audible Noise" which is incorporated by reference herein in its entirety.

BACKGROUND OF THE INVENTION

1. Field of the Invention

The present invention generally relates to the field of power supplies, and more particularly, to reducing audible noise in switch-mode power supplies that have variable switching frequency.

2. Description of the Prior Art

Today, the power supply industry is at the beginning of a major focus shift that puts efficiency improvements across the entire load range in the forefront of customers' performance requirements. This focus on efficiency has been prompted by economic reasons and environmental concerns caused by the continuous growth of the Internet infrastructure and a relatively low energy efficiency of its power delivery system. In fact, the environmental concerns have already prompted introduction of programs and initiatives aimed at reducing the energy waste in power supplies for data-processing applications by challenging power-supply manufacturers to improve efficiency of their products.

A switch-mode power supply comprises a switching power converter for regulating the supply's output voltage. The power converter comprises at least one switch, transformer and a controller that controls the switch according to a switching frequency. This type of power supply suffers from two types of power losses: switching loss and conduction loss. Switching loss is associated with the switching frequency such that this loss increases as switching frequency increases. Conduction loss is associated with current flows in the switch such that the conduction loss increases as the current through the switch increases.

Generally, efficiency across the entire load range requires balancing the switching and conduction losses. This is because efficiency at full load is predominantly determined by conduction losses of semiconductor and magnetic components, whereas efficiency at light/no load is for the most part determined by switching losses of semiconductors and core losses of magnetic components.

One type of switch-mode power supplies operates using a constant switching frequency and another type operates using variable switching frequencies. Regardless of the type, meeting the efficiency requirements at light/no load involves manipulating the switching frequency. In switching power supplies that employ constant switching frequency, cycle skipping (also called burst-mode operation) is employed for meeting the efficiency requirements. In variable switching frequency power supplies, the switching frequency continuously decreases as the load decreases. In some implementations, the burst mode of operation is also used in switch-mode power supplies with variable switching frequency.

However, when the switching frequency is adjusted to be within the upper audible switching frequency range of 200 Hz to 20 kHz, the transformer of the power converter could be excited to generate an unacceptable noise level. As further described below, the switching frequency has an upper audible frequency range and a lower audible frequency range of 20 Hz-200 Hz that is at the lower threshold of the audible range. If the audible noise is above a specified acceptable level, e.g., 25 dB(A)/20.0 uPa for external ac-dc power supplies, appropriate measures should be taken to reduce the audible noise. B. Weisner et al., in "*Relevance of magnetostriction and forces for the generation of audible noise of transformer cores*," IEEE Trans. Magnetics, vol. 36, no. 5, September 2000, describe two separate parts for transformer noise that depend on different excitation mechanisms. The first and most dominant part of the transformer noise is caused by magnetization of the core, which is generally assumed to arise from magnetostriction. Under this mechanism, the core dimensions change when subjected to an applied magnetic field. The second part of the transformer noise is caused by electromagnetic forces created by the magnetic field of the currents in the transformer windings. Generally, magnetostriction can cause a mechanical interaction between the core and the windings that leads to a vibration. The mechanical vibration of the transformer is closely related to the magnetic flux swing.

Known methods for reducing the audible noise during burst-mode of operation are disclosed in 1) U.S. Pat. No. 6,477,066 to F. L'Hermite, entitled "Method and apparatus for reducing audible acoustical noise in a power supply transformer by shaping the waveform of a primary side inductor current," 2) U.S. Pat. No. 6,525,514 to B. Balakrishnan, et all, entitled "Method and apparatus for reducing audio noise in a switching regulator," and 3) U.S. Patent Application Pub. No. 2006/0171179 by J. W. Hall and C. Basso, entitled "Low audible noise power supply method and controller therefore." U.S. Pat. No. 6,477,066 and U.S. Patent Application Pub. No. 2006/0171179 disclose reducing the audible noise in burst-mode of operation by shaping the envelope of the switch current pulses. U.S. Pat. No. 6,525,514 discloses reducing the audio noise by presetting the switching frequency values above the audible range and by decreasing the switch current limit as the load decreases until the lowest current limit has been reached. This limit is low enough that the flux density in the core of the transformer does not produce unacceptable audible noise. Specifically, in U.S. Pat. No. 6,525,514, constant switching frequency power converters with on/off feedback control and with a relatively complex cycle skipping algorithm are considered.

While the above methods apply to burst mode operation, in switch-mode power supplies with variable switching frequency, the audible noise can be completely eliminated by preventing the switching frequency from dropping below the upper threshold of the audible range. This can be achieved directly by limiting the maximum switching period or by limiting the maximum off time. The same can be achieved indirectly by monitoring the switching frequency to detect when the switching frequency drops close to the upper threshold of the audible range and, then, instantly increasing the switching frequency, as described in U.S. Pat. No. 7,202,609 to W. H. M Langeslag and J. W. Strijker, entitled "Noise reduction in a power converter." It should be noted that U.S. Pat. No. 7,202,609 is directed towards the problem of reducing the audible noise in power converters with variable switching frequency. The disclosed arrangement in this patent cover a power supply design that decreases the switching frequency as the load increases. Thus, the switching frequency can only drop below the upper threshold of the audible range at high load conditions that are associated with when exceptional operating circumstances exist, such as a short circuit, initial power up, or sudden turn off situations. U.S. Pat. No. 7,202,609 is not directed to audible noise reduction in switch-mode power supplies under normal (non-exceptional) operating conditions where the switching frequency continuously decreases as the load decreases.

Therefore, there exists a need for a system and method for audible noise reduction in switch-mode power supplies with variable switching frequency where the switching frequency continuously decreases as the load decreases.

SUMMARY OF THE INVENTION

Briefly, according to the present invention, a power supply that provides output power to a load comprises a power converter coupled to the load. The power converter has at least one switch that is operated at a switching frequency that results in switch current flows (or pulses) through the switch. The switching frequency has an audible frequency range that results in unacceptable audible noise that is reduced by the present invention. A controller regulates the output power by controlling the switching frequency based on a feedback signal that is coupled to the load. The controller comprises a comparator and a current sense resistor for comparing a reference voltage with a current sense voltage developed across the current sense resistor by the switch current flows. An audible noise reduction circuit adjusts either one of the reference voltage, the current sense voltage or the current sense resistor based on a detected switching frequency such that the controller maintains the switching frequency above the audible frequency range in response to an adjustment. The switching frequency can be detected based on either one of a switch drive signal, the feedback signal or a current flow signal through the load. The audible noise reduction circuit can be disabled when the detected switching frequency is within a lower audible frequency range, e.g., 20 Hz-200 Hz, that is at the lower threshold of the audible frequency range.

DETAILED DESCRIPTIONS OF THE PREFERRED EMBODIMENTS

Figure 1:
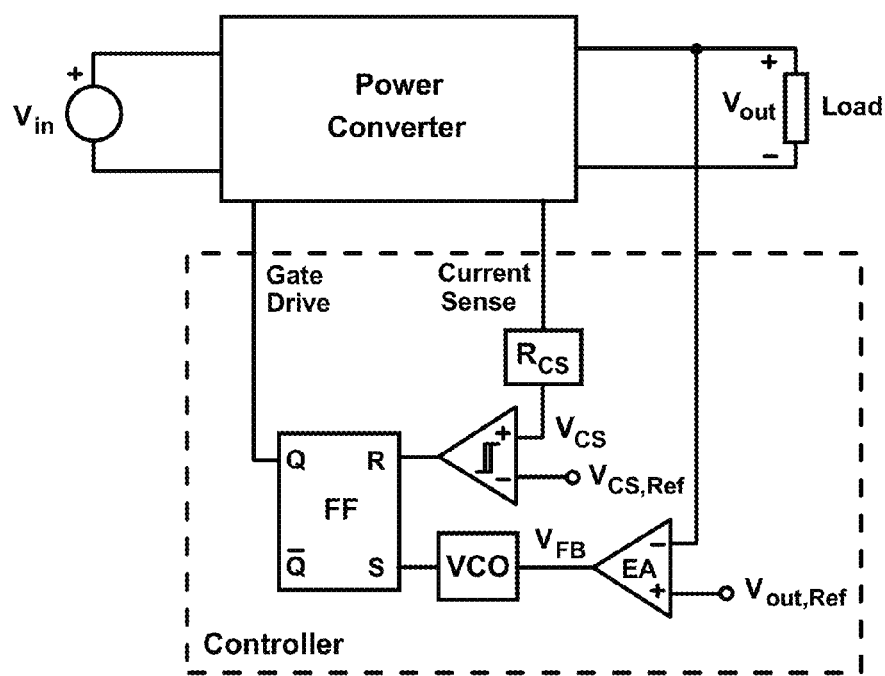
FIG. 1 shows the block diagram of a conventional switch-mode power supply.

The present invention reduces audible noise in a switch-mode power supply that decreases the switching frequency continuously as the load decreases. The power supply of the invention has a power converter coupled between an input voltage source and a load. The power converter has one or more switches that are switched to on and off states with a variable switching frequency according to load conditions to provide regulated output power to the load. The current through each one of the one or more switches, when turned on, rises in accordance with a switching duty cycle to form switch current flows or pulses. Such current flows or pulses have peak values that are reached before a switch is turned off.

In one embodiment, the audible noise is reduced by causing the peak value of the switch current pulses to decrease in discrete steps so that the switching frequency is increased above the upper threshold of audible range in order to maintain regulated power at the load as the load decreases. The peak value of the current pulses is reduced to a level that the corresponding magnetic flux swing in the core of the transformer of the power converter does not produce unacceptable audible noise. Various methods are disclosed for detecting the switching frequency and for decreasing the peak value of the switch current pulses for keeping the switching frequency above the audible noise range. According to one embodiment of the invention, the switching frequency is directly monitored to detect whether it has dropped close to the upper threshold of the audible range $f_{swThH1}$. According to another embodiment, the switching frequency is indirectly monitored to detect whether it has dropped close to the upper threshold of the audible range $f_{swThH1}$. Such indirect monitoring of the switching frequency can be accomplished either by monitoring the load current $I_{Load}$ or by monitoring the feedback voltage $V_{FB}$.

When the peak value of the main switch current pulses is decreased, according to any one the embodiments described above, the switching frequency is increased in order to provide the same power to the load. However, at very light loads and at no load, an increased switching frequency results in increased switching losses. In order to meet efficiency requirements that limit the maximum input power at very light loads and at no load, the audible noise reduction circuit is disabled when the switching frequency is so low, e.g., 20 Hz-200 Hz, that a magnetic flux swing in the core of the transformer does not produce unacceptable audible noise (due to the nonlinear sensitivity of the human ear to the audible frequencies). This switching frequency range is herein called a lower audible frequency range which is at the lower threshold of the audible frequency range. In such situation, the switching frequency is allowed to decrease to the lower audible switching frequency range by increasing the peak value of the switch current pulses to their original peak value.

Before proceeding with describing the present invention, a brief description of the prior art is provided in connection with FIG. 1, which shows the block diagram of a known switch-mode power supply, which in this example, operates in a discontinuous conduction mode (DCM). The power supply comprises a power converter having a variable switching frequency $f_{sw}$ that is coupled between an input voltage source, e.g. an AC line, and a load. For example, the load can correspond to the load of a computing device that varies based on corresponding operating conditions. The power converter of the power supply of FIG. 1 is assumed to be a flyback converter having a main switch that operates according to a variable switching frequency. The current flowing through a converter switch $i_{sw}$ comprises current pulses having a peak value $I_{Peak}$. As stated above, if the peak value $I_{peak}$ is not sufficiently low, the corresponding magnetic flux swing in is the core of the transformer of the flyback converter (not shown) can produce unacceptable audible noise.

The switch-mode power supply of FIG. 1 also includes a known controller forming a continuous feedback circuit that couples the output of the power supply to the power converter. The controller varies the switching-frequency $f_{sw}$ based on a controller input voltage that corresponds to the conditions of the load. The controller input voltage is applied to an error amplifier (EA) having an input reference voltage $V_{out, Ref}$. A voltage-controlled oscillator (VCO) is controlled by a feedback voltage $V_{FB}$ at the output of the EA. The output of the VCO $V_{vco}$ is coupled to a "Set" input S of a flip-flop FF. The VCO is configured to be responsive to the feedback voltage $V_{FB}$, which decreases as the load decreases in order to decrease the switching frequency $f_{sw}$. In this way, the VCO controls the converter's main switches with a variable switching frequency $f_{sw}$. A comparator has one input coupled to a current-sense (CS) voltage $V_{cs}$, which is developed across a current-sense resistor $R_{cs}$ based on sensed switch current $i_{sw}$. Another input of the comparator is coupled to a current-sense reference voltage $V_{cs, Ref}$. The output of the comparator is coupled to a "Reset" input R of the flip-flop FF so that a duty cycle initiated by the VCO is terminated by the comparator when the current-sense voltage $V_{cs}$ reaches the reference voltage level $V_{CS,Ref}$. In this way, the output of the comparator is used for resetting a duty cycle initiated by the VCO. The FF also outputs a gate drive voltage $V_{GD}$ that controls turning the converter's main switch on and off.

Figure 2:
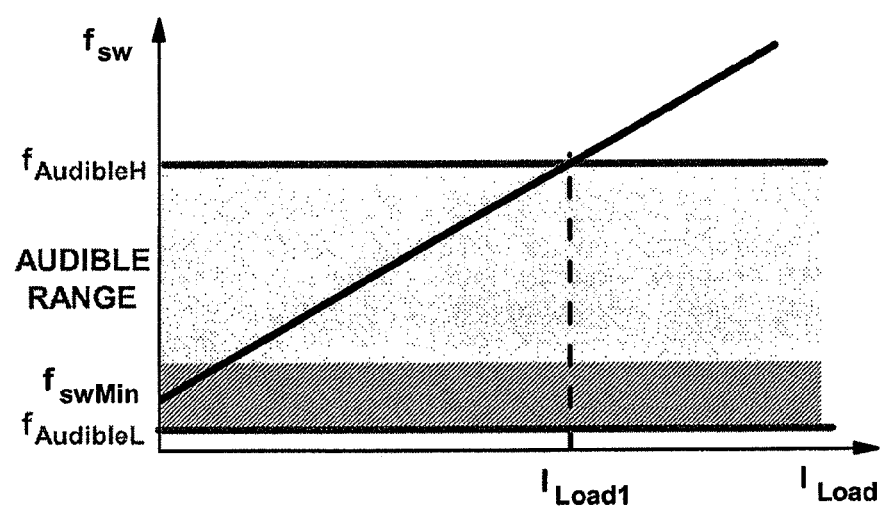
FIG. 2 shows the relationship between the switching frequency and load current of a converter in the power supply of FIG. 1.

FIG. 2 shows the relationship between the switching frequency $f_{sw}$ and load current $I_{Load}$ of the power supply of FIG. 1. For simplicity, in FIG. 2, a linear relationship between the switching frequency and load current is assumed, which is a good approximation for a DCM operating converter such as forward, half-bridge, full-bridge, flyback, boost, etc. As shown in FIG. 2, the switching frequency $f_{sw}$ has an audible range within the range of $f_{AudibleL}$ and $f_{AudibleH}$. FIG. 2 shows that the switching frequency $f_{sw}$ enters the audible range at load current $I_{Load1}$. The minimum switching frequency, $f_{swMin}$, is obtained at no load, which is typically above the lower threshold of the audible range, $f_{AudibleL}$.

Figure 3:
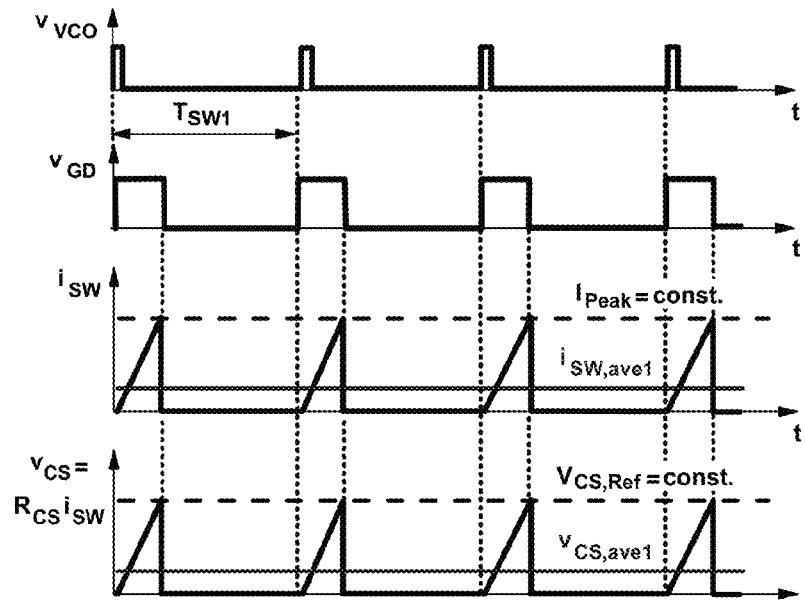
FIGS. 3 (a) and (b) show various operating waveforms of the power supply of FIG. 1.
Figure 3:
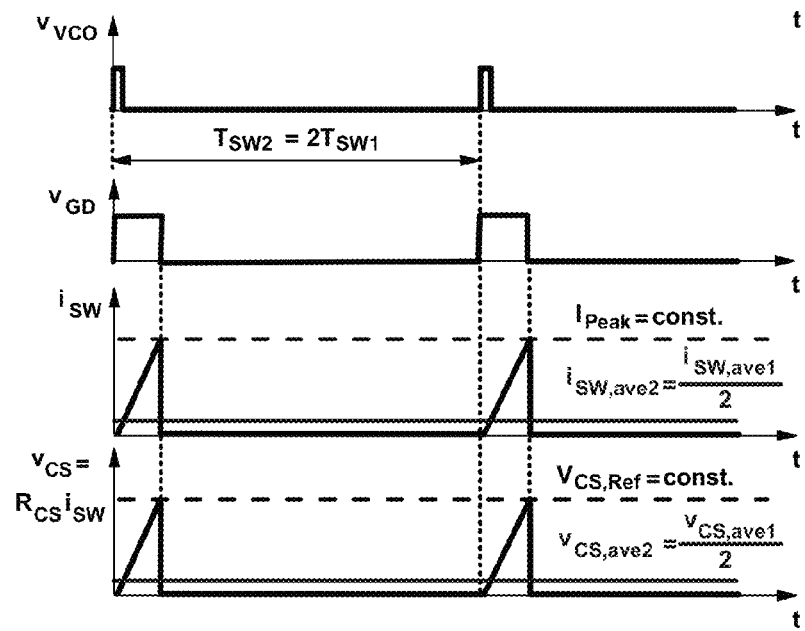

FIGS. 3 (a) and (b) show graphs of various waveforms of the power supply of FIG. 1 described. FIG. 3(a) shows the waveforms at a first switching frequency and FIG. 3(b) shows that waveforms at a second switching frequency such that the first switching frequency is twice the second switching frequency. FIGS. 3(a) and (b) show that under the prior art method, if the peak value of the switch current pulses $I_{Peak}$ is to remain constant, a linear relationship should exist between the switching frequency $f_{sw}$ and load current $I_{Load}$ so that when the second switching frequency $f_{sw}$ is decreased to be one half of the first switching frequency, as illustrated in FIG. 3(b), the average switch current $i_{sw}$ and consequently the load current $I_{Load}$ is also decreased by the same ratio, e.g., one half.

Figure 4:
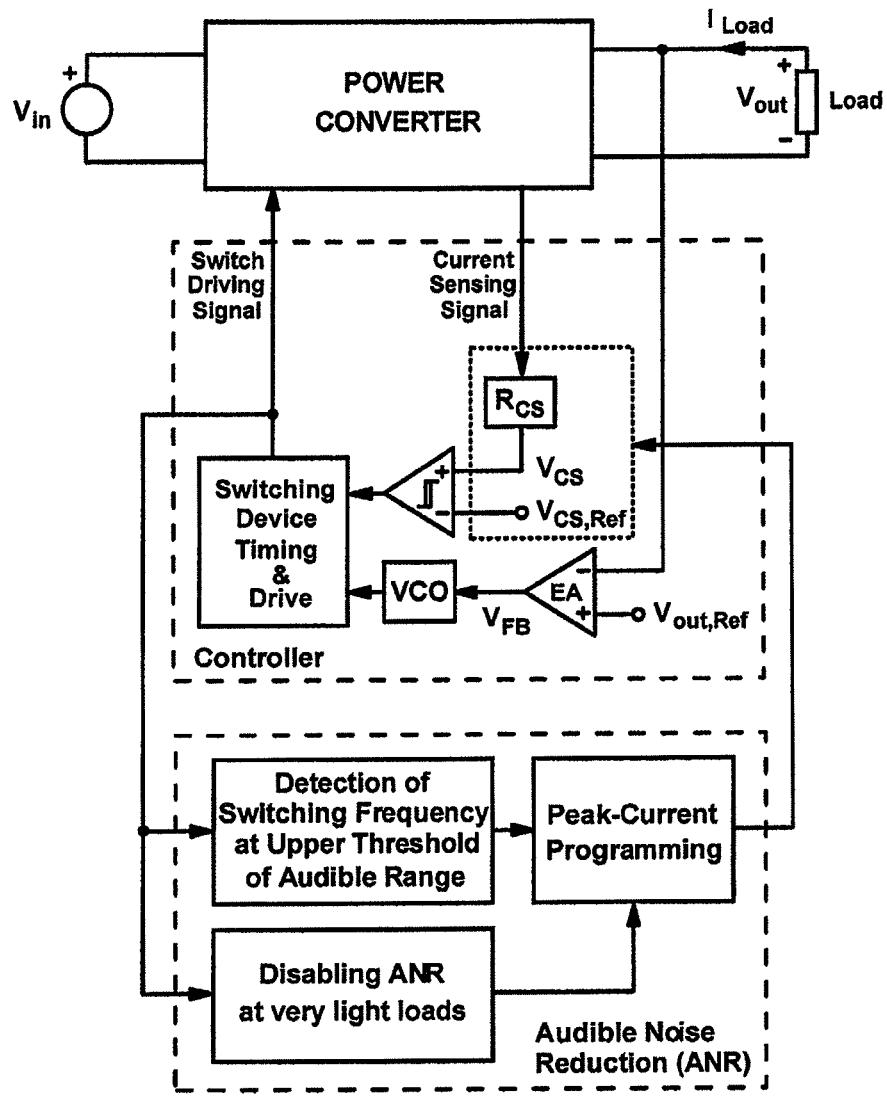
FIG. 4 shows the block diagram of a power supply according to one embodiment of the invention.

FIG. 4 shows the block diagram of a power supply according to one embodiment of the invention having a power converter that can be arranged to any suitable configuration, including but not limited to forward, half-bridge, full-bridge, flyback, or boost configurations. The power converter supplies regulated power to the load from an input power source. The power converter has one or more switches that are switched to on and off states with a variable switching frequency according to operation conditions of the load via a feedback controller circuit. The current through each one of the one or more switches when turned on rises in accordance with a switching duty cycle to form switch current pulses having peak values that are reached before a switch is turned off in response to a corresponding switch driving signal provided by the controller via a Switching Device Timing & Drive (SDTD) block. The SDTD block is responsive to the output of a VCO and a comparator. As described in connection with FIG. 1, the output of the VCO is controlled by the feedback voltage $V_{FB}$ at the output of the EA and the output of the comparator is used for resetting a duty cycle initiated by the VCO when the current-sense voltage $V_{CS}$ reaches reference voltage level $V_{CS,Ref}$.

An audible noise reduction (ANR) circuit is coupled to the controller for reducing the audible noise according to various embodiments of the invention. More specifically, the embodiment shown in FIG. 4 reduces audible noise by directly monitoring the switching frequency by monitoring the switch driving signal. The ANR circuit comprises a first block for the detection of the switching frequency at the upper threshold of the audible range. A second block programs the peak value of the main switch current pulses and a third block disables the audible noise reduction circuit at very light loads and at no load. As shown, the inputs of the first block and the third block are coupled to the switch driving signal allowing for direct monitoring of the switching frequency. In order to reduce the peak value of the switch current pulses, the output of the peak-current programming block modifies either the reference voltage value of the current-sense voltage $V_{CS,Ref}$, the current-sense voltage $V_{CS}$ itself, or the value of the current-sense resistor $R_{CS}$.

Figure 5:
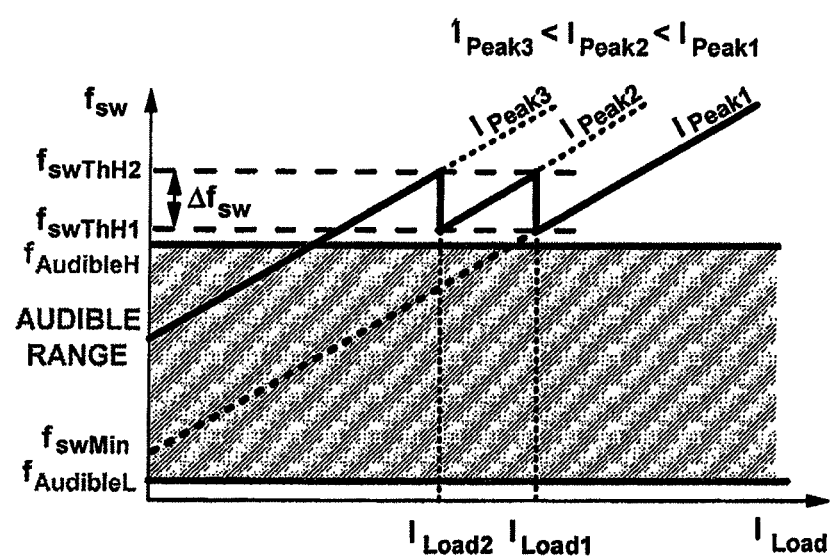
FIG. 5 shows the relationship between the switching frequency and load current of a converter in the power supply of FIG. 4.

FIG. 5 shows a graph of the relationship between the load current $I_{Load}$ and the switching frequency $f_{sw}$ according to one embodiment of the present invention where audible noise is reduced by controlling the switching frequency so that it stays above the audible range of $f_{AudibleL}$ to $f_{AudibleH}$ as the load decreases, within a high and low threshold switching frequency range of $f_{swThH1}$ and $f_{swThH2}$. The load currents $I_{Load1}$ and $I_{Load2}$ correspond to decreasing load conditions of the power supply operating according to this embodiment of the invention. In this embodiment, the power supply is operated to decrease the peak value of the switch current pulses $I_{Peak}$ in discrete steps from $I_{Peak1}$ to $I_{Peak2}$ to $I_{Peak3}$ until the peak value of the switch current pulses is at a level which is sufficiently low such that the generated switch current pulses do not produce magnetic flux swing in the core of the transformer that causes unacceptable audible noise.

In an embodiment, after detecting that the switching frequency has dropped close to the upper threshold of the audible range, the peak value of the main switch current pulses is decreased in discrete steps. Consequently, the switching frequency increases by $\Delta f_{sw}$, as shown in FIG. 5, in order to provide the same power to the load.

FIGS. 6(a) and 6(b) show comparative waveforms of one embodiment where the peak value of the main switch current pulses is decreased by $\Delta I_{peak}$ by decreasing the reference value of the current-sense voltage, $V_{CS,Ref}$. FIGS. 7(a) and 7(b) show comparative waveforms according to another embodiment where the peak value of the main switch current pulses is decreased by $\Delta I_{peak}$ by adding a DC bias $V_{cs,bias}$ to the current-sense voltage. FIGS. 8(a) and 8(b) show comparative graphs according to yet another embodiment where the peak value of the switch current pulses is decreased by $\Delta I_{peak}$ by increasing the value of the current-sense resistor from $R_{CS1}$ to $R_{CS2}$.

Figure 9:
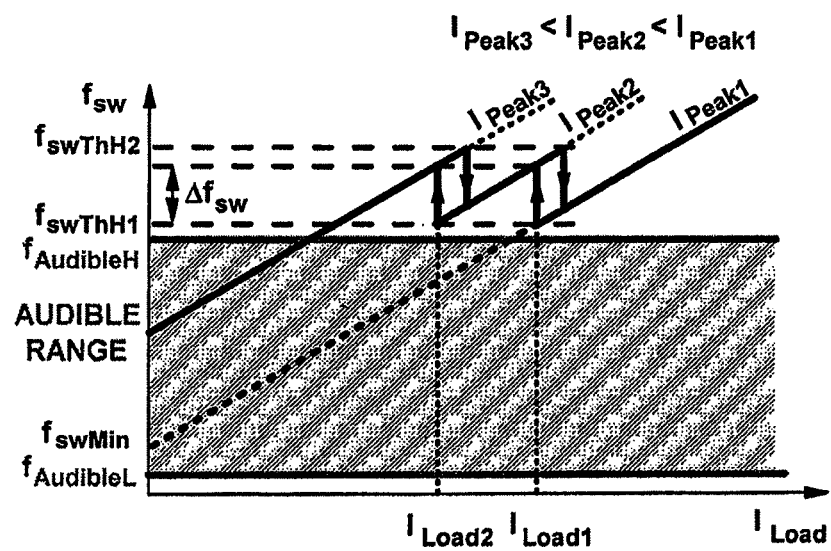
FIG. 9 shows additional relationships between the switching frequency and load current according to other implementations of the invention.

FIG. 9 shows a graph of load current $I_{Load}$ relative to the switching frequency $f_{sw}$ under an embodiment where a hysteresis is added to the control of the switching frequency in order to prevent the oscillation of the switching frequency when the peak value of the main switch current pulses changes between two consecutive discrete values. It should be noted that the switching frequency control by employing three discrete peak values of the main switch current pulses as shown in FIGS. 5 and 9 is an illustrative example and that the number of the discrete peak values of the main switch current pulses can be selected from a minimum value of two to a finite large number.

Figure 10:
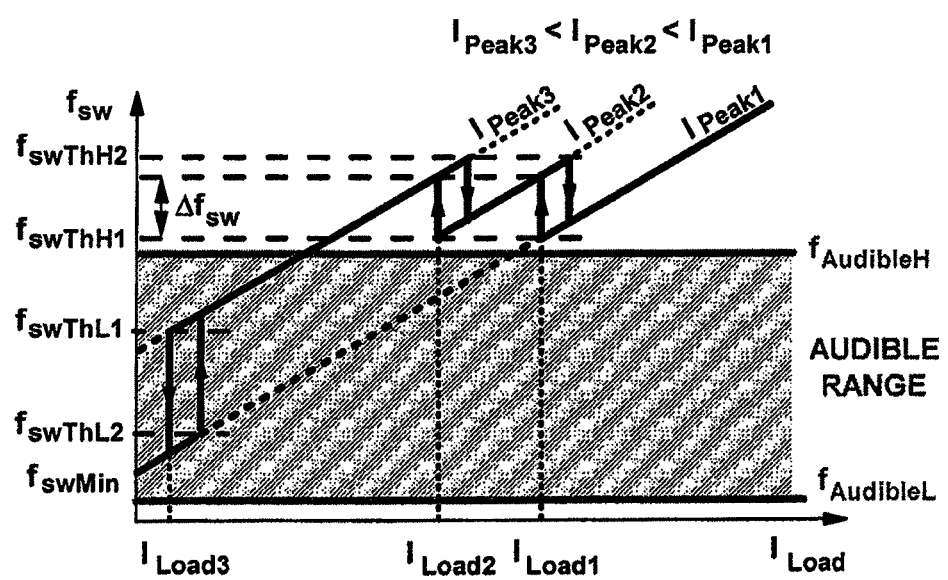
FIG. 10 shows yet another method of the present invention for the audible noise reduction.

At very light loads and at no load, an increased switching frequency results in increased switching losses. Consequently, meeting standard requirements that limit the maximum input power at very light loads and at no load can be an issue. FIG. 10 shows a graph of load current $I_{Load}$ relative to the switching frequency $f_{sw}$ at very light loads and at no load, where the audible noise reduction circuit is disabled and the switching frequency is decreased to its original value at $I_{Load}=I_{Load3}$. In fact, at $I_{Load}=I_{Load3}$, the switching frequency is decreased by increasing the peak value of the main switch current pulses to the original peak value $I_{Peak1}$. It should be noted that at very light loads and at no load, the original switching frequency is, typically, close to the lower threshold of the audible range. Therefore, a larger peak value of the main switch current pulses and, consequently, a larger magnetic flux swing in the core of the transformer will not produce unacceptable audible noise as a result of the nonlinear sensitivity of the human ear to the audible frequencies.

Figure 11:
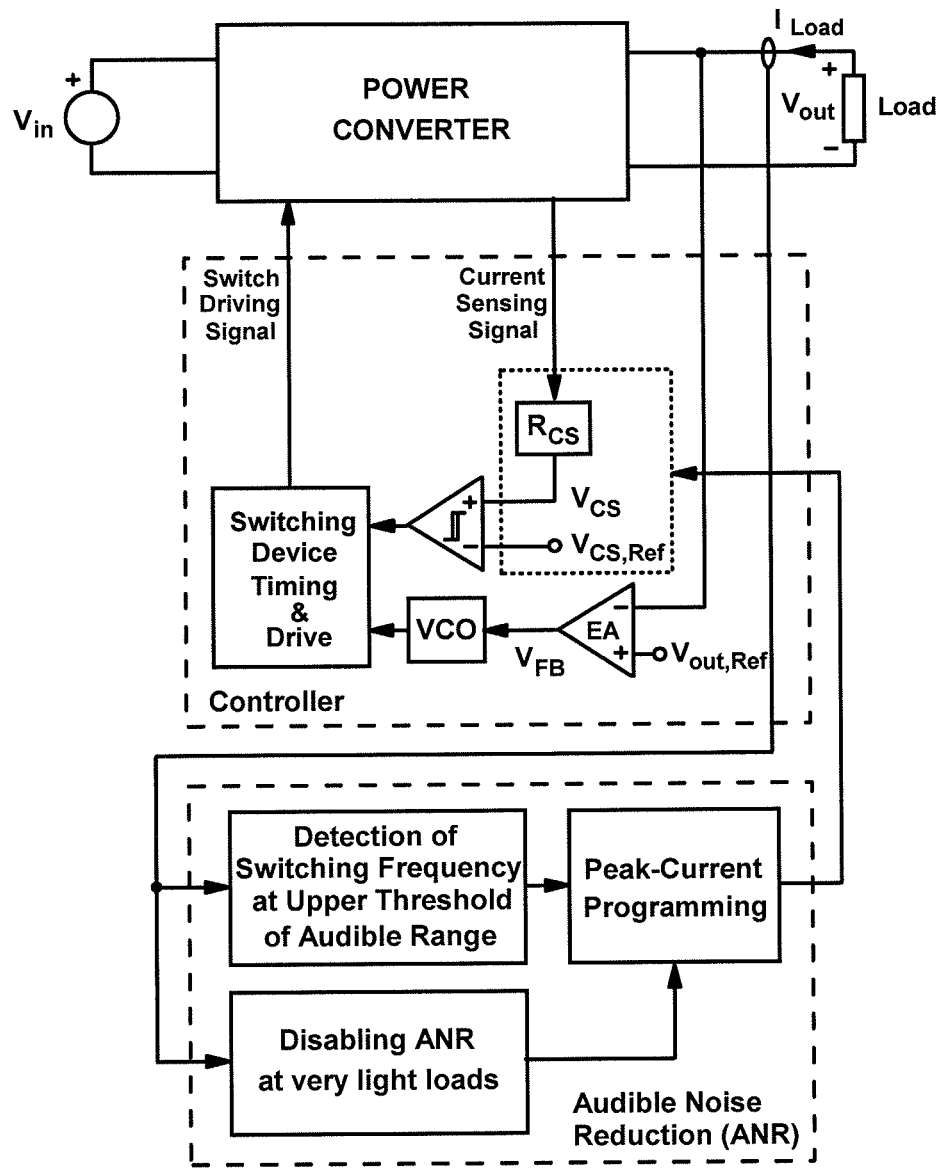
FIG. 11 shows the block diagram of a power supply according to another embodiment of the invention.
Figure 12:
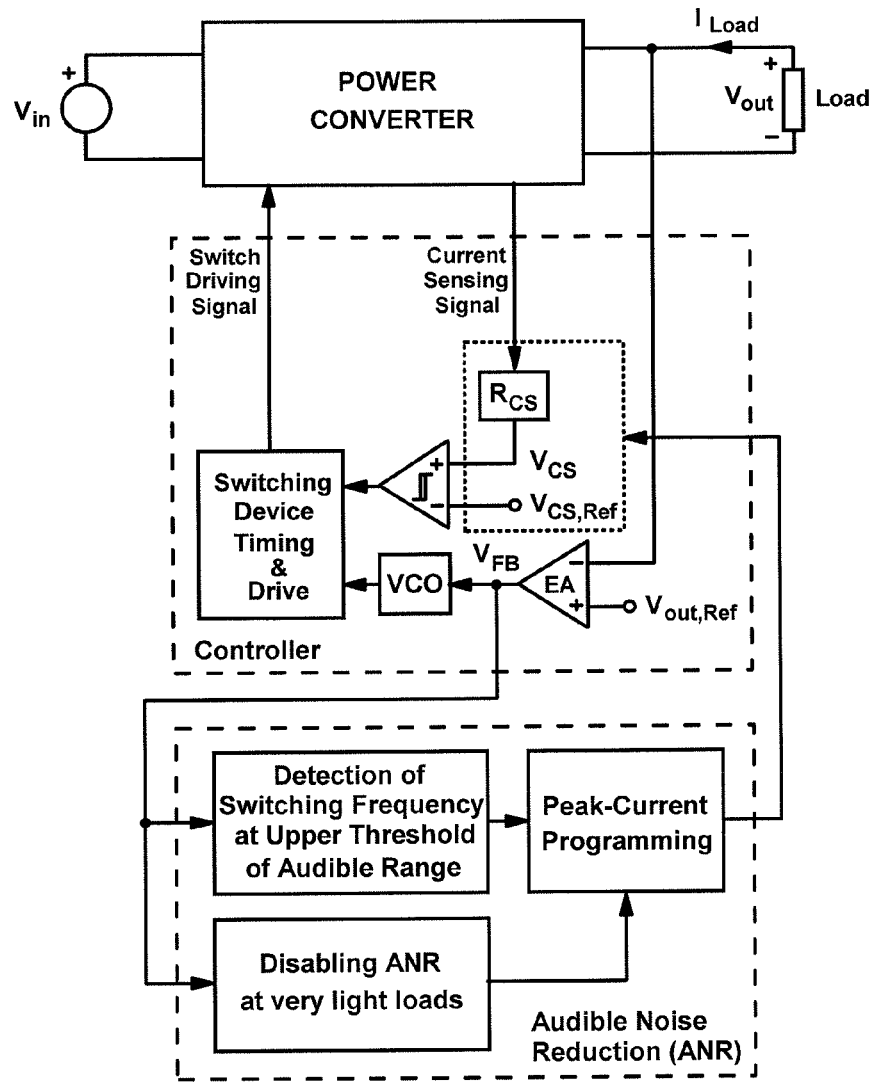
FIG. 12 shows the block diagram of a power supply according to yet another embodiment of the invention.

FIG. 11 shows another embodiment of the present invention that reduces audible noise by monitoring the load current, which indirectly corresponds to the switching frequency of the power converter. As shown, a signal representing the load current is applied to the inputs of the first block and the third block of the ANR circuit. FIG. 12 shows yet another embodiment of the present invention that reduces audible noise by monitoring the feedback voltage, which also indirectly corresponds to the switching frequency. As shown, the feedback voltage $V_{FB}$ at the output of the EA and input of the VCO is applied to the inputs of the first block and the third block of the ANR circuit.

Figure 13:
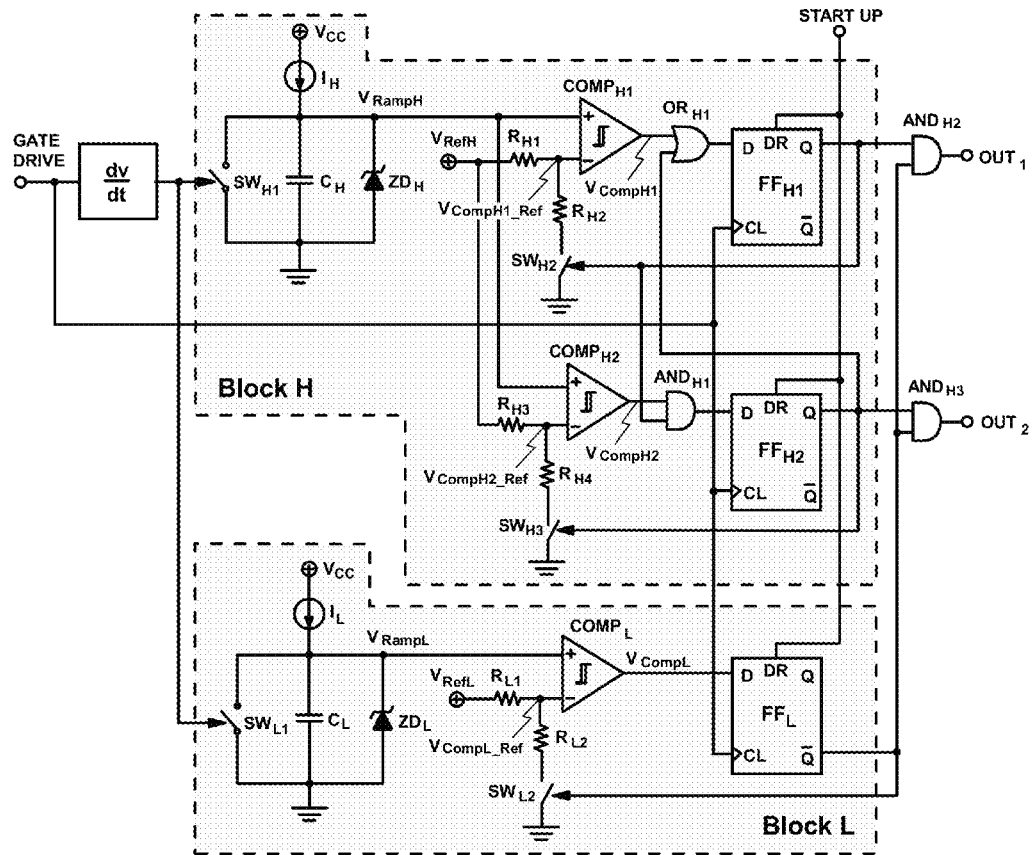
FIG. 13 shows one implementation according to the embodiment of the present invention presented in FIG. 4.

FIG. 13 shows an example of the implementation of the ANR circuit. Key waveforms that illustrate the operation of the ANR circuit in FIG. 13 are presented in FIGS. 14-19. Specifically, key waveforms at $I_{Load}=I_{Load1}$, $I_{Load}=I_{Load2}$, and $I_{Load}=I_{Load3}$, when the load current decreases, are presented in FIGS. 14-16, respectively; whereas, key waveforms around $I_{Load}=I_{Load3}$, $I_{Load}=I_{Load2}$, and $I_{Load}=I_{Load1}$, when the load current increases, are presented in FIGS. 17-19, respectively. Block H in FIG. 13 implements the control of the switching frequency at the upper threshold of the audible range around load currents $I_{Load}=I_{Load1}$ and $I_{Load}=I_{Load2}$; whereas, Block L in FIG. 13 implements the control of the switching frequency inside the audible range at very light loads around $I_{Load}=I_{Load3}$. The output signals $OUT_1$ and $OUT_2$ of the control circuit in FIG. 13 control the peak value of the main switch current pulses as defined in Table I.

TABLE I

Relationship between peak value of the main switch current pulses and control signals $OUT_1$ and $OUT_2$

| $OUT_1$ | $OUT_2$ | $I_{Peak}$ |
|---|---|---|
| 0 | 0 | $I_{Peak1}$ |
| 1 | 0 | $I_{Peak2}$ |
| 1 | 1 | $I_{Peak3}$ |

In FIG. 13, the switching frequency, i.e., the switching period is monitored by converting time to voltage. The ramp voltages, $v_{RampH}$ and $v_{RampL}$, are generated by charging the respective ramp capacitors $C_H$ and $C_L$ with a constant current, $I_H$ and $I_L$, respectively. At the beginning of a switching period, the ramp capacitors are discharged by briefly turning on the respective ramp switches $SW_{H1}$ and $SW_{L1}$ in parallel with the ramp capacitors. The control signal for the ramp switches is obtained by differentiating the gate drive signal of the main switch.

The detection of the switching frequency at the upper threshold of the audible range is achieved by comparing ramp voltage $v_{RampH}$ at the noninverting input of comparators $COMP_{H1}$ and $COMP_{H2}$ to the corresponding reference voltage, $V_{CompH1\_Ref}$ and $V_{CompH2\_Ref}$ at the inverting input of comparators $COMP_{H1}$ and $COMP_{H2}$. The detection of the switching frequency inside the audible range at very light loads is achieved by comparing ramp voltage $v_{RampL}$ at the noninverting input of comparator $COMP_L$ to the reference voltage $V_{CompL\_Ref}$ at the inverting input of comparator $COMP_L$. To control the switching frequency according to the method shown in FIG. 10, each reference voltage has two discrete levels. For example, the reference voltage of comparator $COMP_{H1}$ has a higher level equal to the voltage of reference voltage source $V_{RefH}$ as long as output Q of D flip-flop $FF_{H1}$ is at LOW level. When output Q of D flip-flop $FF_{H1}$ becomes HIGH, switch $SW_{H2}$ turns on, and the reference voltage of comparator $COMP_{H1}$ takes a lower level. The lower level is determined by the voltage divider $R_{H1}$-$R_{H2}$. The reference voltage of comparators $COMP_{H2}$ and $COMP_L$ is determined similarly to the reference voltage of comparator $COMP_{H1}$. However, it should be noted that the reference voltage of comparator $COMP_L$ is controlled by inverting output $\overline{Q}$ of D flip-flop $FF_L$. It should also be noted that the ramp voltages are clamped by Zener diodes $ZD_H$ and $ZD_L$ to a level slightly higher than the voltage of the respective reference voltage sources.

The output voltage of a comparator is at HIGH level if the switching frequency is equal or smaller than the relevant reference frequency, i.e., if the switching period is equal or greater than the relevant reference period. The information about the switching frequency obtained in the current switching period is used in the next switching period to control the peak value of the main switch current pulses. In fact, the voltage level at the output of a comparator is stored in a corresponding D flip-flop at the positive edge of the gate drive signal. It should be noted that the output voltage of a comparator can easily meet the setup-time requirement of a positive-edge triggered D flip-flop due to the delay time of the comparator. Initially, all D flip-flops are reset through the direct reset (DR) pins.

Figure 14:
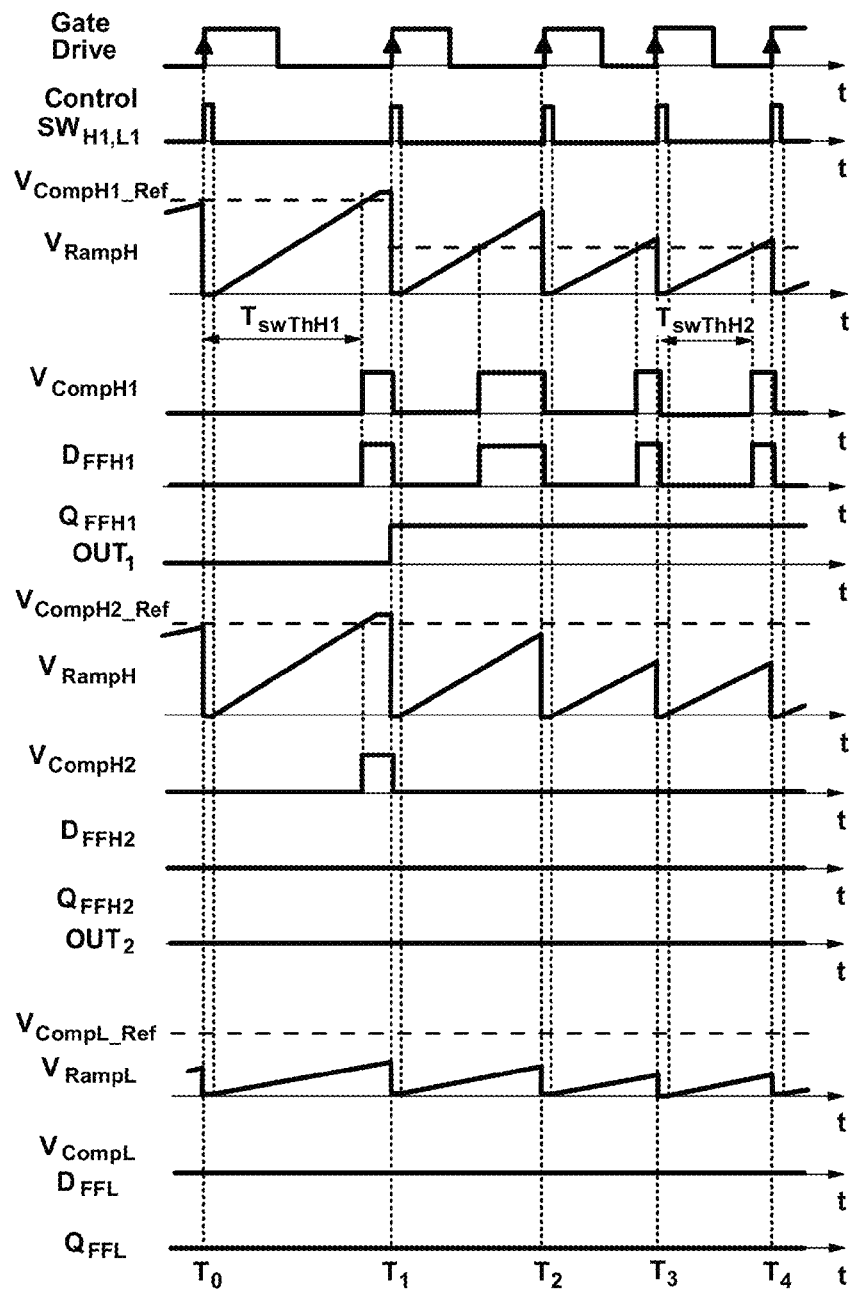
FIG. 14 shows waveforms that illustrate the operation of the circuit in FIG. 13 around $I_{Load}=I_{Load1}$ shown in FIG. 10, when the switching frequency decreases.

The waveforms in FIG. 14 illustrate the operation of the circuit in FIG. 13 at $I_{Load}=I_{Load1}$ shown in FIG. 10. At $I_{Load}=I_{Load1}$, the switching frequency decreases close to the upper threshold of the audible range. Consequently, the peak value of the main switch current pulses decreases from $I_{Peak1}$ to $I_{Peak2}$, resulting in an increased switching frequency $\Delta f_{sw}$ shown in FIG. 10.

Before instant $t=T_0$, the output voltage of all three D flip-flops, $FF_{H1}$, $FF_{H2}$, and $FF_L$, is LOW and, therefore, both output signals $OUT_1$ and $OUT_2$ are LOW, and $I_{Peak}=I_{Peak1}$. The reference voltage of comparators $COMP_{H1}$ and $COMP_{H2}$, $V_{CompH1\_Ref}$ and $V_{CompH2\_Ref}$, has HIGH value, whereas, the reference voltage of comparator $COMP_L$, $V_{CompL\_Ref}$, has LOW value. During switching cycle $[T_0, T_1]$, the switching frequency decreases below threshold frequency $f_{swThH1}$, i.e., the switching period increases above threshold period $T_{swThH1}$, and ramp voltage $v_{RampH}$ crosses the reference voltage level of comparators $COMP_{H1}$ and $COMP_{H2}$. Consequently, the output voltage of comparators $COMP_{H1}$ and $COMP_{H2}$ becomes HIGH. The D input of D flip-flop $FF_{H1}$ also becomes HIGH through the OR gate $OR_{H1}$; however, the D input of D flip-flop $FF_{H2}$ stays LOW because it is inhibited by the LOW output voltage of D flip-flop $FF_{H1}$ through AND gate $AND_{H1}$. At the beginning of the next switching cycle, $[T_1, T_2]$, at the positive edge of the gate drive signal, the data at the D input of the D flip-flops is transferred to the Q output of the flip-flops, resulting in $Q_{FFH1}=1$, $Q_{FFH2}=0$, and $Q_{FFL}=0$, and, consequently, $OUT_1=1$ and $OUT_2=0$. According to Table I, the peak value of the main switch current pulses decreases from $I_{Peak1}$ to $I_{Peak2}$. It should be noted in FIG. 14 that the gate drive pulse width in switching cycle $[T_0, T_1]$ is larger than the gate drive pulse width in the following switching cycles. To keep the output voltage of the power converter constant, the feedback voltage will increase, resulting in an increased switching frequency.

When output Q of D flip-flop $FF_{H1}$ becomes HIGH, the reference voltage of comparator $COMP_{H1}$ decreases from HIGH to LOW level. As long as the switching frequency is lower than $f_{swThH2}$, i.e., the switching period is larger than $T_{swThH2}$, ramp voltage $v_{RampH}$ will always cross the LOW reference voltage level of comparator $COMP_{H1}$ and, therefore, output Q of D flip-flop $FF_{H1}$ will stay HIGH.

Figure 15:
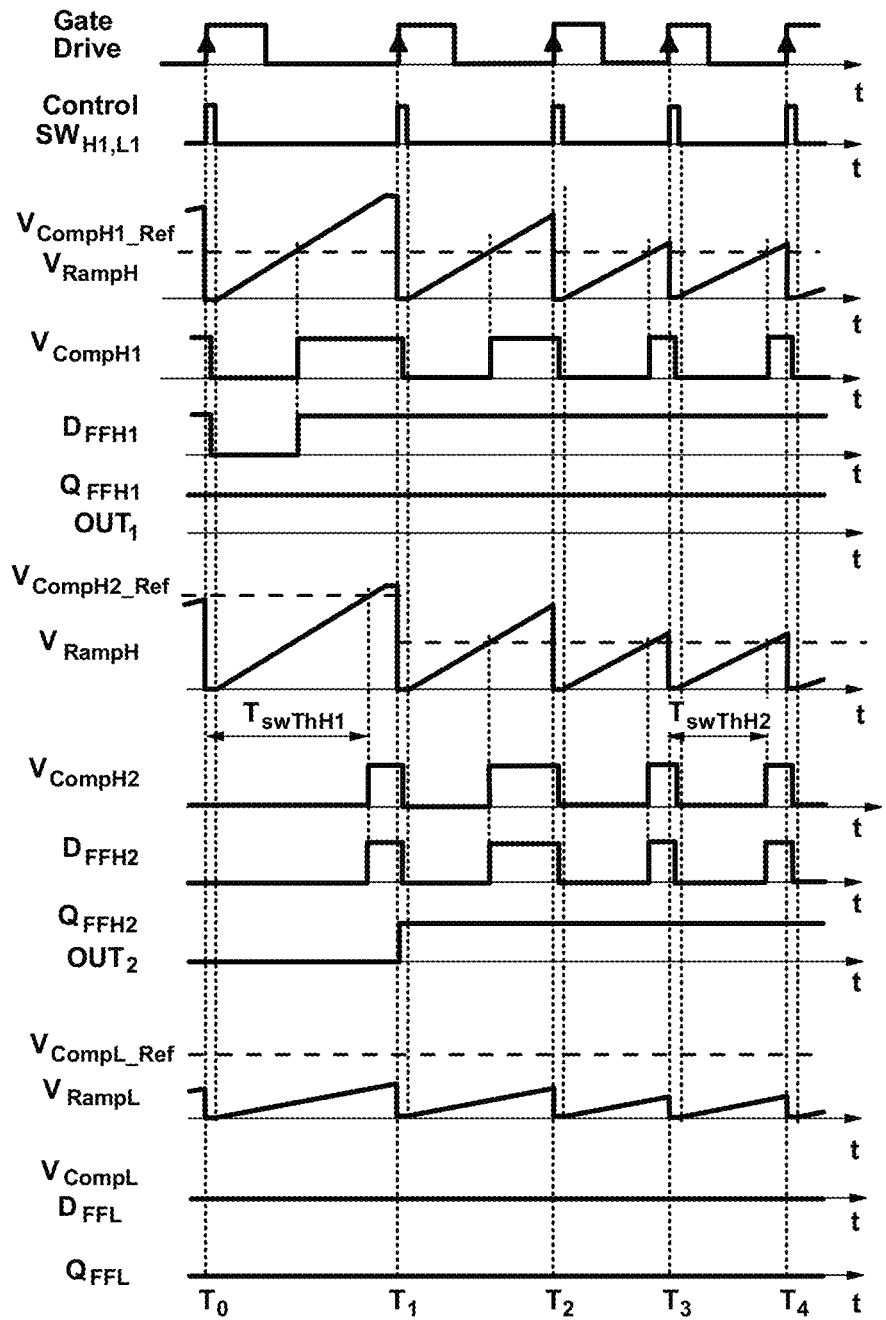
FIG. 15 shows waveforms that illustrate the operation of the circuit in FIG. 13 around $I_{Load}=I_{Load2}$ shown in FIG. 10, when the switching frequency decreases.

The waveforms in FIG. 15 illustrate the operation of the circuit in FIG. 13 at $I_{Load}=I_{Load2}$ shown in FIG. 10, where the switching frequency decreases the second time close to the upper threshold of the audible range and, consequently, the peak value of the switch current pulses decreases from $I_{Peak2}$ to $I_{Peak3}$, resulting in an increased switching frequency $\Delta f_{sw}$ shown in FIG. 10.

Before instant $t=T_0$, the output voltage of D flip-flop $FF_{H1}$ is HIGH and the output voltage of D flip-flops $FF_{H2}$ and $FF_{L1}$ is LOW. Therefore, the signals that control the peak value of the main switch current pulses are $OUT_1=1$ and $OUT_2=0$, and $I_{Peak}=I_{Peak2}$. The reference voltage of comparators $COMP_{H1}$ and $COMP_{H2}$, $V_{CompH1\_Ref}$ and $V_{CompH2\_Ref}$, is LOW and HIGH, respectively. The reference voltage of comparator $COMP_L$, $V_{CompL\_Ref}$, is also LOW. During switching cycle $[T_0, T_1]$, the switching frequency decreases below threshold frequency $f_{swThH1}$, i.e., the switching period increases above threshold period $T_{swThH1}$, and ramp voltage $v_{RampH}$ crosses the reference voltage level of comparator $COMP_{H2}$. Consequently, the output voltage of comparator $COMP_{H2}$ becomes HIGH and the D input of D flip-flop $FF_{H2}$ also becomes HIGH through the AND gate $AND_{H1}$ because now it is inhibited by the HIGH output voltage of D flip-flop $FF_{H1}$. At the beginning of the next switching cycle, $[T_1, T_2]$, at the positive edge of the gate drive signal, the HIGH logic level at the D input of D flip-flop $FF_{H2}$ is transferred to its Q output, resulting in $Q_{FFH2}=1$. The output of the other two D flip-flops is $Q_{FFH1}=1$ and $Q_{FFL}=0$. Consequently, both output signals become HIGH, i.e., $OUT_1=1$ and $OUT_2=1$. According to Table I, the peak value of the main switch current pulses decreases from $I_{Peak2}$ to $I_{Peak3}$. It should be noted in FIG. 15 that the gate drive pulse width in switching cycle $[T_0, T_1]$ is larger than the gate drive pulse width in the following switching cycles. To keep the output voltage of the power converter constant, the feedback voltage will increase, resulting in an increased switching frequency.

When the output voltage of D flip-flop $FF_{H2}$ becomes HIGH, the reference voltage of comparator $COMP_{H2}$ decreases from HIGH to LOW level. As long as the switching frequency is lower than $f_{swThH2}$, i.e., the switching period is larger than $T_{swThH2}$, ramp voltage $v_{RampH}$ will always cross the LOW reference voltage level of comparator $COMP_{H2}$ and, therefore, the output voltage of D flip-flop $FF_{H2}$ will stay HIGH. It should be noted in FIG. 15 that the HIGH output voltage of D flip-flop $FF_{H2}$ will force the D input of D flip-flop $FF_{H1}$ to HIGH logic level through the OR gate $OR_{H1}$.

Figure 16:
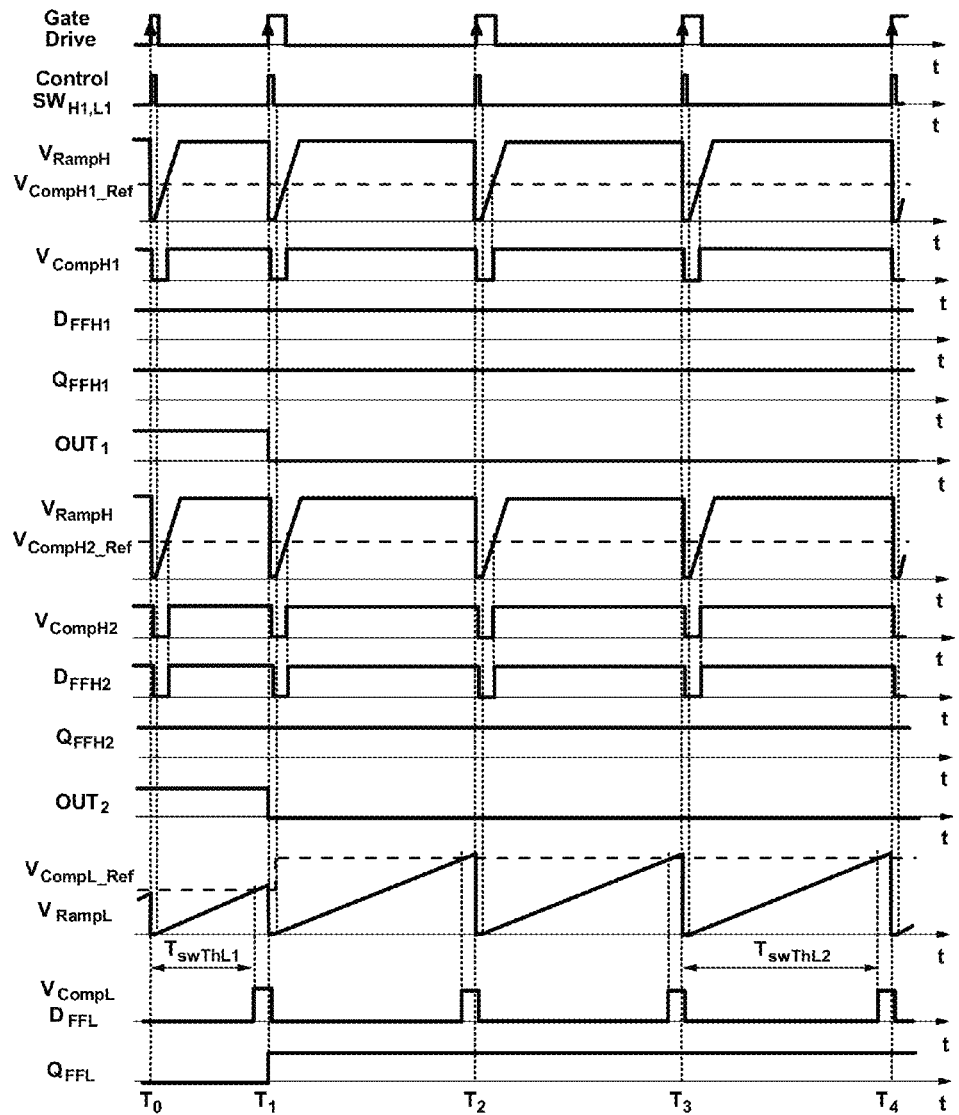
FIG. 16 shows waveforms that illustrate the operation of the circuit in FIG. 13 around $I_{Load}=I_{Load3}$ shown in FIG. 10, when the switching frequency decreases.

The waveforms in FIG. 16 illustrate the operation of the circuit in FIG. 13 at very light load $I_{Load}=I_{Load3}$ shown in FIG. 10. At $I_{Load}=I_{Load3}$, the switching frequency decreases to threshold level $f_{swThL1}$ inside the audible range. Consequently, the peak value of the switch current pulses increases from $I_{Peak3}$ to $I_{Peak1}$, resulting in a further decreased switching frequency as shown in FIG. 10.

Before instant $t=T_0$, the output voltage of D flip-flops $FF_{H1}$ and $FF_{H2}$ is HIGH and the output voltage of D flip-flop $FF_L$ is LOW. Therefore, both output signals are HIGH, i.e., $OUT_1=1$ and $OUT_2=1$, and $I_{Peak}=I_{Peak3}$. The reference voltage of all three comparators $COMP_{H1}$, $COMP_{H2}$, and $COMP_L$, $V_{CompH1\_Ref}$, $V_{CompH2\_Ref}$ and $V_{CompL\_Ref}$, is LOW. During switching cycle $[T_0, T_1]$, the switching frequency decreases below threshold frequency $f_{swThL1}$, i.e., the switching period increases above threshold period $T_{swThL1}$, and ramp voltage $v_{RampL}$ crosses the reference voltage level of comparator $COMP_L$. Consequently, the output voltage of comparator $COMP_L$ and the D input of D flip-flop $FF_L$ become HIGH. At the beginning of the next switching cycle, $[T_1, T_2]$, at the positive edge of the gate drive signal, the HIGH logic level at the D input of D flip-flop $FF_L$ is transferred to its Q output, resulting in $Q_{FFL}=1$. Consequently, through the AND gates $AND_{H2}$ and $AND_{H3}$, both output signals become LOW, i.e., $OUT_1=0$ and $OUT_2=0$. According to Table I, the peak value of the main switch current pulses increases from $I_{Peak3}$ to $I_{Peak1}$. It should be noted in FIG. 16 that the gate drive pulse width in switching cycle $[T_0, T_1]$ is smaller than the gate drive pulse width in the following switching cycles. To keep the output voltage of the power converter constant, the feedback voltage will decrease, resulting in a further decreased switching frequency.

When output Q of D flip-flop $FF_L$ becomes HIGH, the reference voltage of comparator $COMP_L$ increases from LOW to HIGH level. It should be noted that because the gate drive pulse width is much smaller than the switching period and the output voltage regulation loop is fast, during switching period $[T_1, T_2]$ the feedback voltage will decrease to the lower level well before the end of the switching cycle. As long as the switching frequency is lower than $f_{swThL2}$, i.e., the switching period is larger than $T_{swThL2}$, ramp voltage $v_{RampL}$ will always cross the HIGH reference voltage level of comparator $COMP_L$ and, therefore, output Q of D flip-flop $FF_L$ will stay HIGH, keeping both output signals that control the peak value of the main switch current pulses LOW, i.e., $OUT_1=0$ and $OUT_2=0$.

Figure 17:
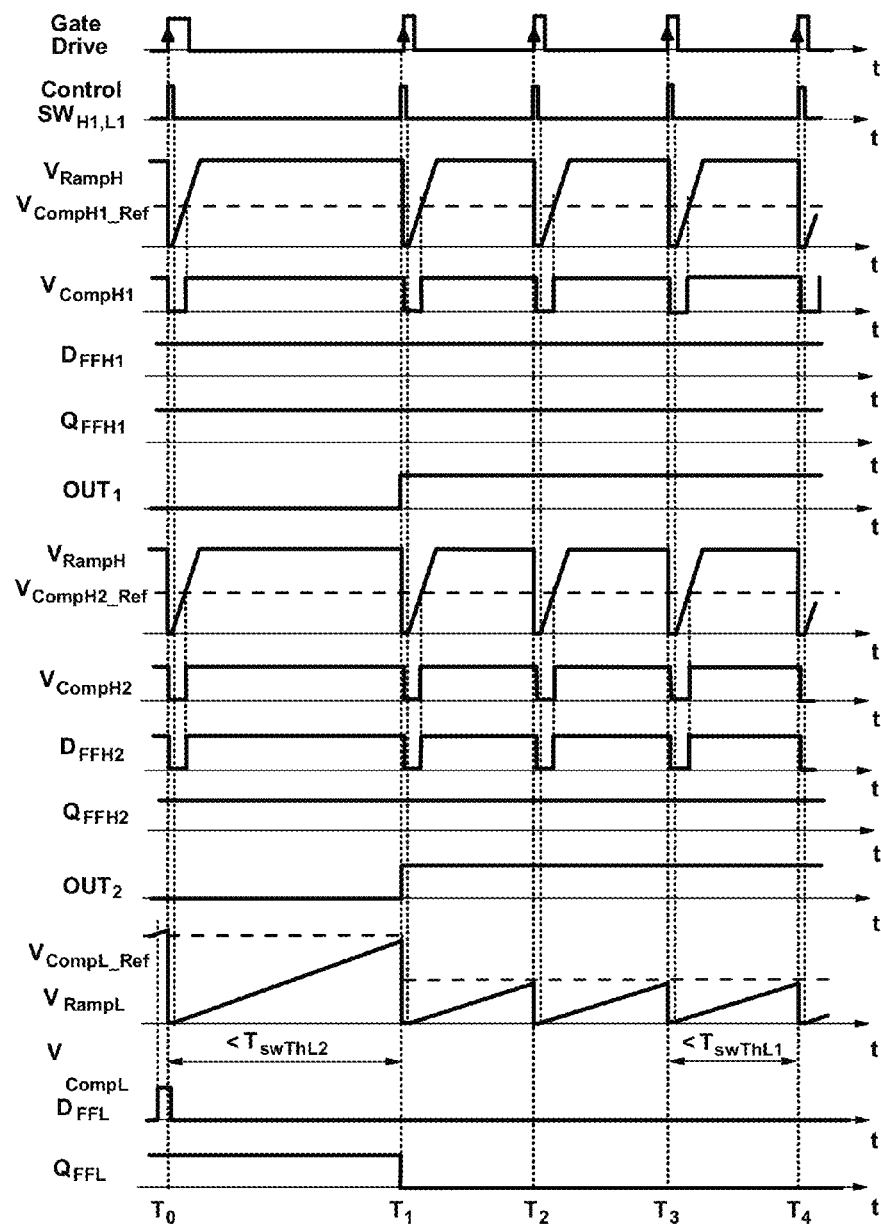
FIG. 17 shows waveforms that illustrate the operation of the circuit in FIG. 13 around $I_{Load}=I_{Load3}$ shown in FIG. 10, when the switching frequency increases.
Figure 18:
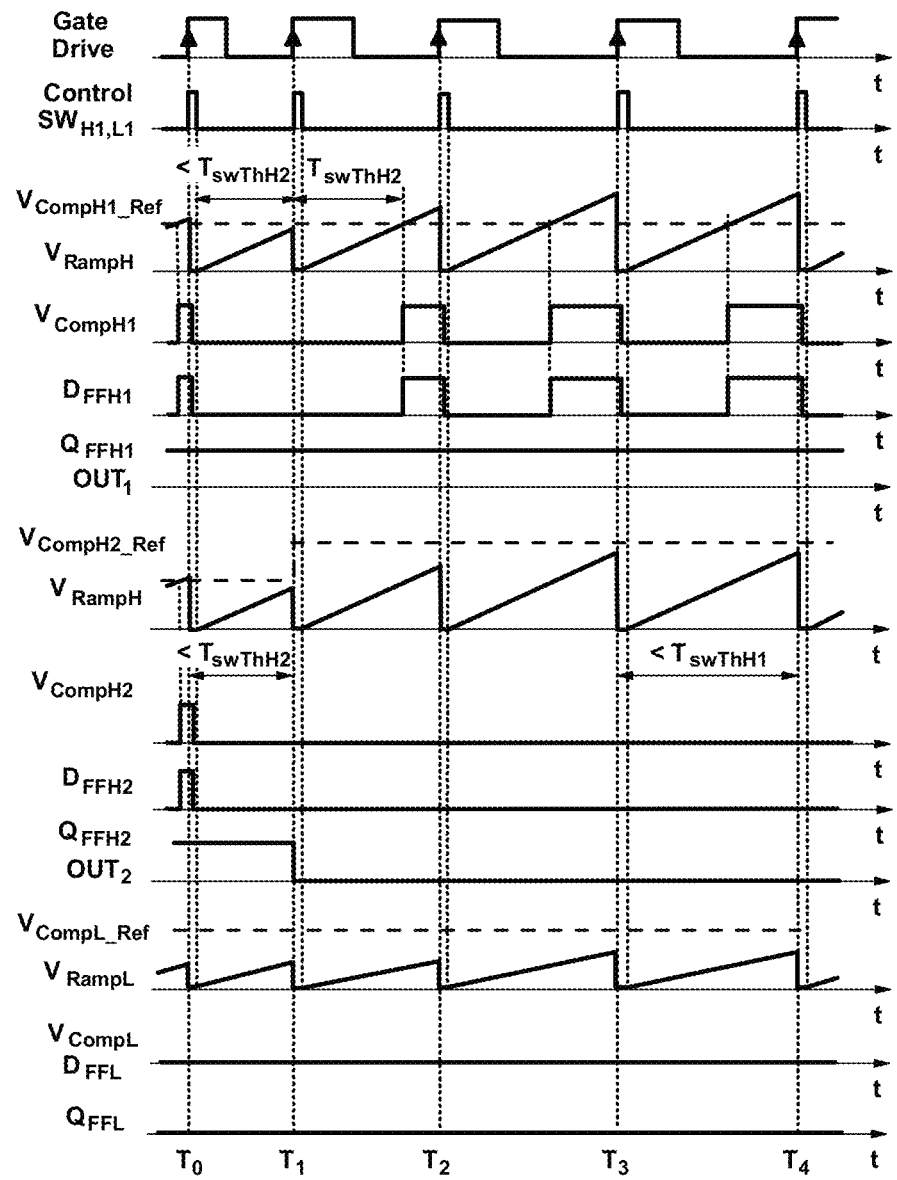
FIG. 18 shows waveforms that illustrate the operation of the circuit in FIG. 13 around $I_{Load}=I_{Load2}$ shown in FIG. 10, when the switching frequency increases.
Figure 19:
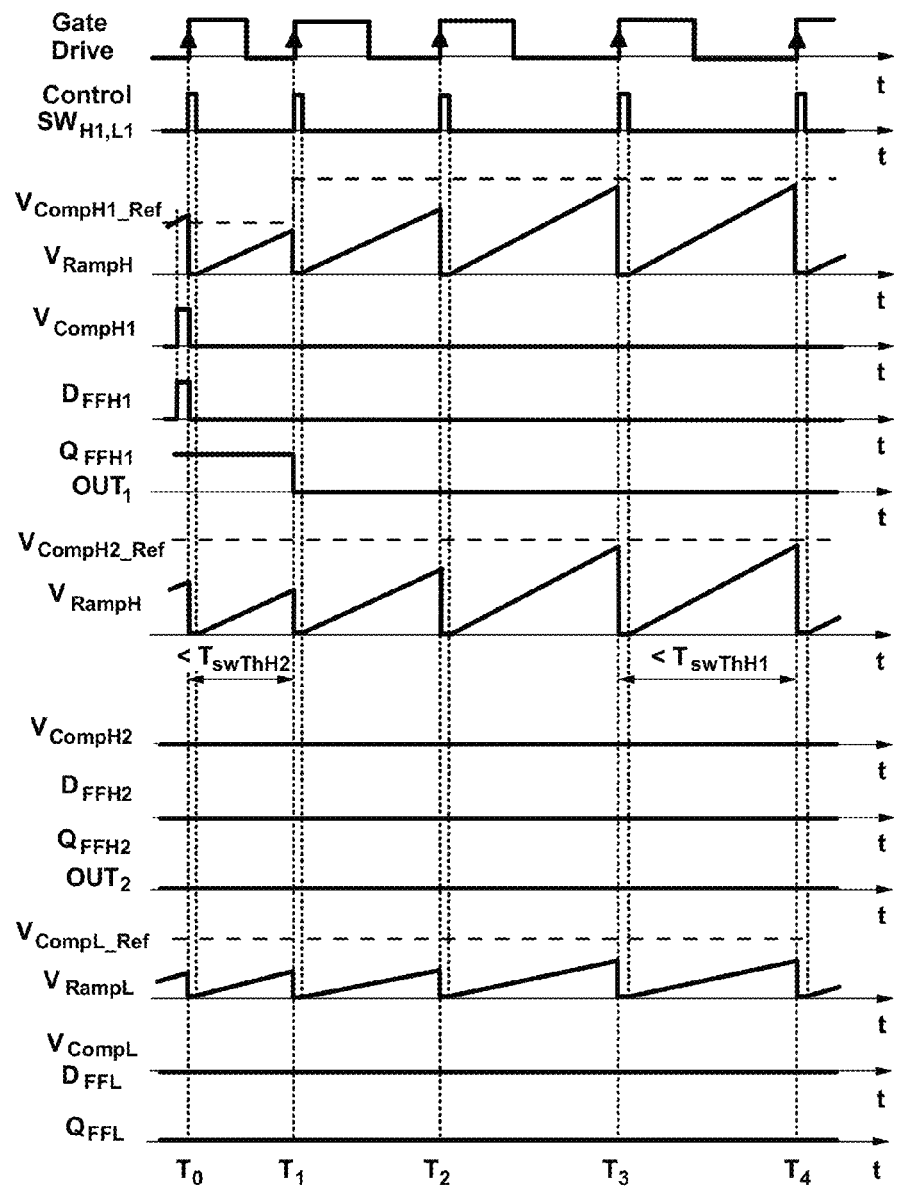
FIG. 19 shows waveforms that illustrate the operation of the circuit in FIG. 13 around $I_{Load}=I_{Load1}$ shown in FIG. 10, when the switching frequency increases.

FIGS. 17-19 illustrate key waveforms of the operation of the circuit in FIG. 13 around $I_{Load}=I_{Load3}$, $I_{Load}=I_{Load2}$, and $I_{Load}=I_{Load1}$, when the load current increases, respectively. It can be seen in FIGS. 17-19 that the operation of the circuit in FIG. 13 is similar to the operation when the load current decreases, just in the opposite direction.

Figure 6:
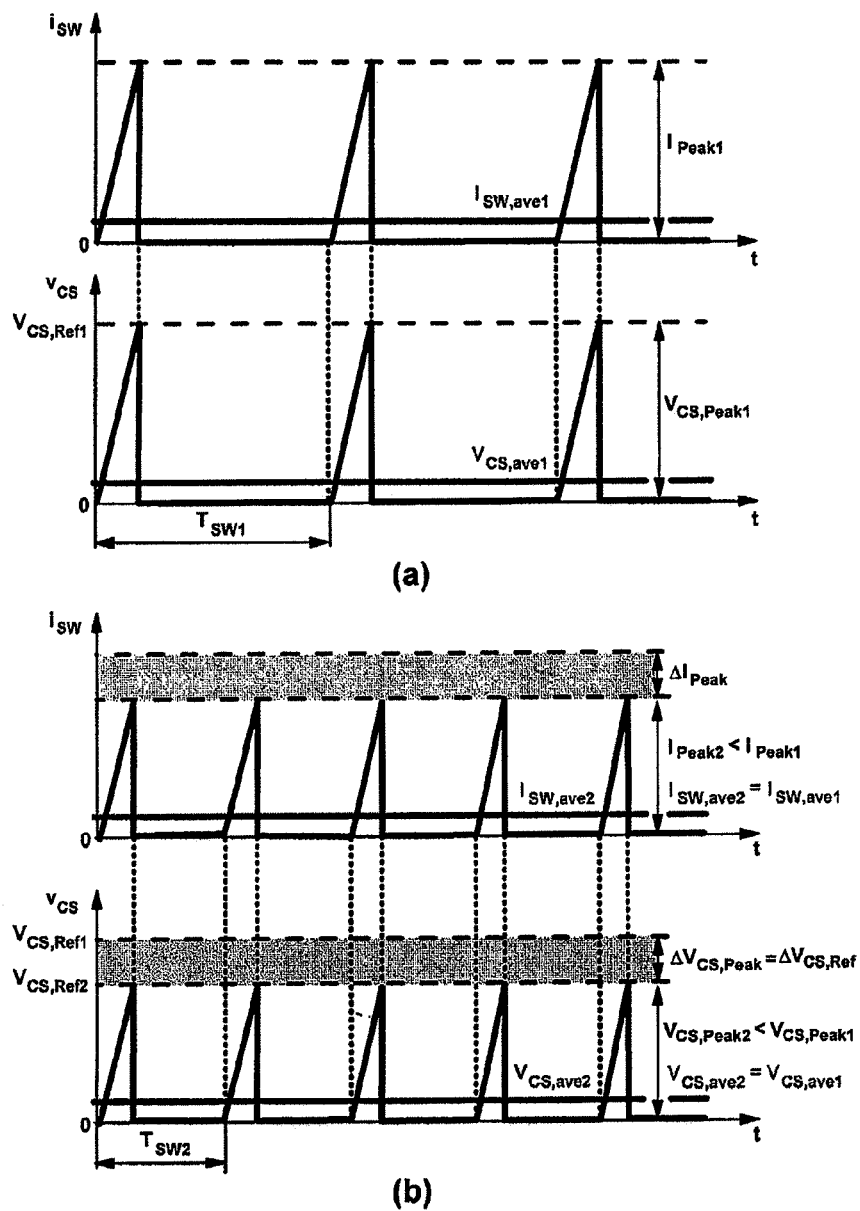
FIGS. 6 (a) and (b) show various operating waveforms of the power supply of the invention according to one audible noise reduction embodiment.
Figure 20:
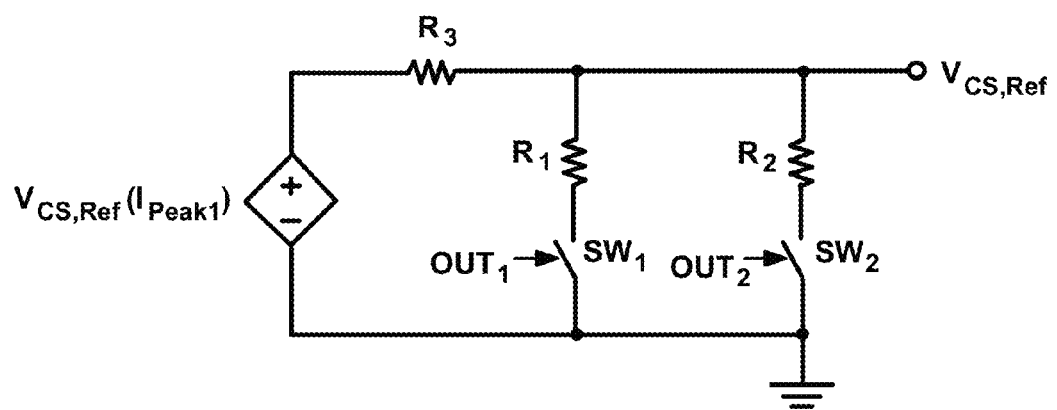
FIG. 20 shows one circuit embodiment for decreasing the peak value of the main switch current pulses.

FIG. 20 shows one implementation of the peak-current programming block in FIGS. 4, 11 and 12 according to Table I and according to FIG. 6, where the peak value of the switch current pulses is decreased by decreasing the reference value of the current-sense voltage, $V_{CS,Ref}$. The peak-current programming block includes two switches $SW_1$ and $SW_2$ with respective control signals $OUT_1$ and $OUT_2$. The control signals correspond to the outputs of the first and third block of the ANR circuit. The output $V_{CS,Ref}$ of the peak-current programming block is directly coupled to the comparator's input of the controller. Current-sense reference voltage $V_{CS,Ref}(I_{Peak1})$ corresponds to the maximum peak value of the main switch current pulses, $I_{Peak1}$. When both control signals are LOW, i.e., $OUT_1=0$ and $OUT_2=0$, both switches $SW_1$ and $SW_2$ are open, resulting in $$V_{CS,Ref}=V_{CS,Ref}(I_{Peak1}). \quad (1)$$

When control signals are $OUT_1=1$ and $OUT_2=0$, the current-sense reference voltage is determined as $$V_{CS,Ref} = \frac{R_1}{R_1+R_3} \cdot V_{CS,Ref}(I_{Peak1}), \quad (2)$$

which corresponds to the second peak value of the main switch current pulses, $I_{Peak2}$. Finally, when both control signals are HIGH, i.e., $OUT_1=1$ and $OUT_2=1$, the current-sense reference voltage is determined as $$V_{CS,Ref} = \frac{R_1 \| R_2}{R_1 \| R_2 + R_3} \cdot V_{CS,Ref}(I_{Peak1}), \quad (3)$$

which corresponds to the minimum peak value of the main switch current pulses, $I_{Peak3}$.

Figure 7:
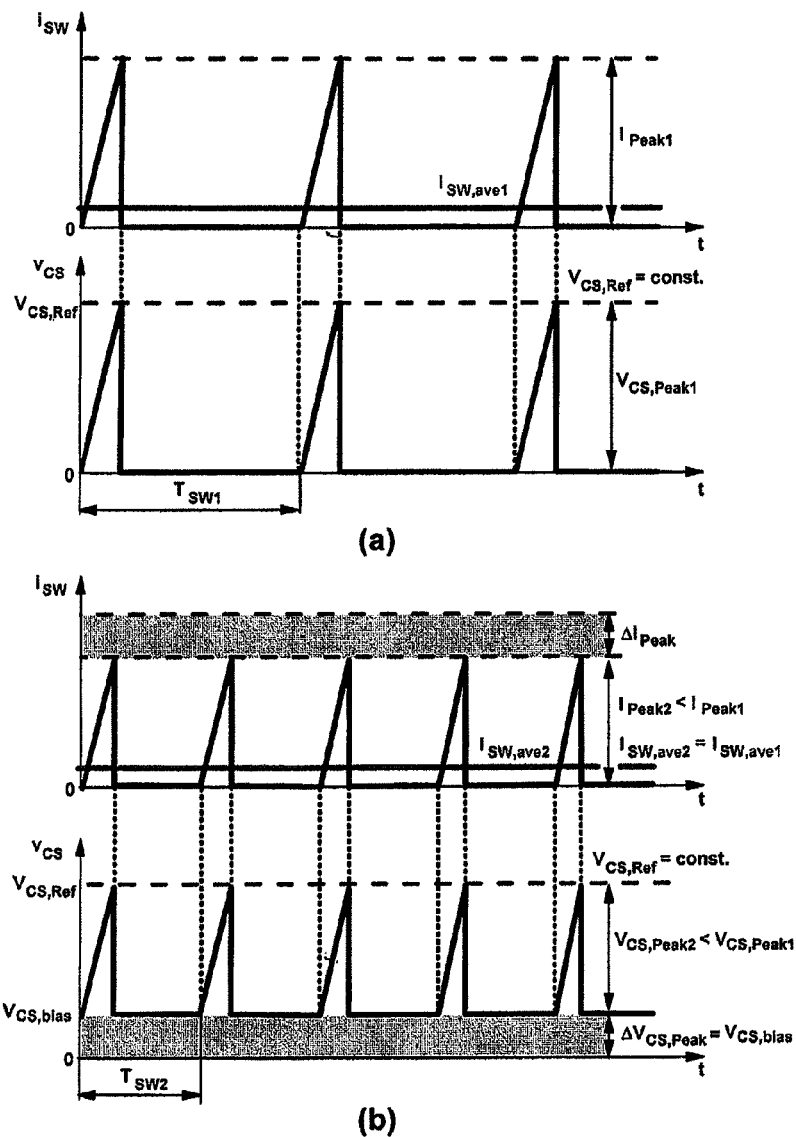
FIGS. 7 (a) and b) show various operating waveforms of the power supply of the invention according to another audible noise reduction embodiment.
Figure 21:
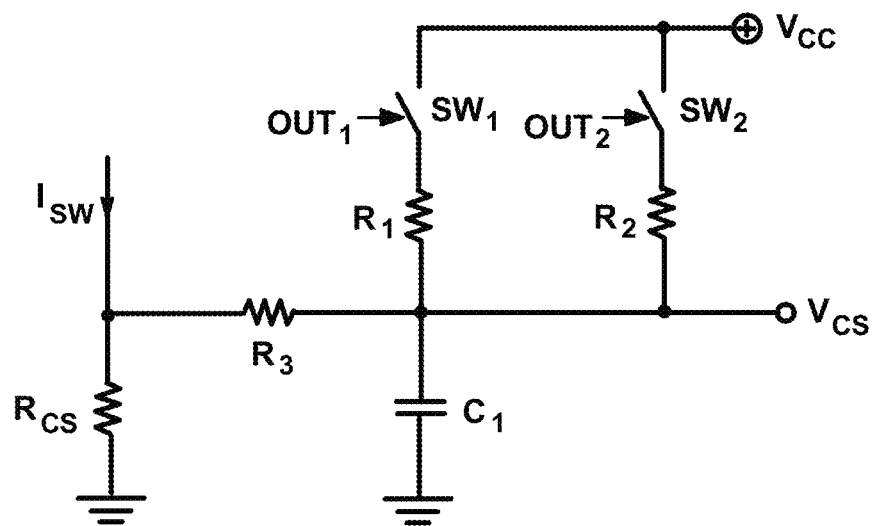
FIG. 21 shows another circuit embodiment for decreasing the peak value of the main switch current pulses.

FIG. 21 shows another implementation of the peak-current programming block in FIGS. 4, 11 and 12 according to Table I and according to FIG. 7, where the peak value of the main switch current pulses is decreased by adding a dc bias to the current-sense voltage, $v_{CS}$. The peak-current programming block receives control signals from the first and third block of the ANR circuit. The output $v_{CS}$ of the peak-current programming block is coupled to the current-sense voltage input, $v_{CS}$, of the comparator of the controller. When both control signals are LOW, i.e., $OUT_1=0$ and $OUT_2=0$, both switches $SW_1$ and $SW_2$ are open and the current-sense voltage $v_{CS}$ is equal to the voltage across the current-sense resistor. It should be noted in FIG. 21 that resistor $R_3$ and capacitor $C_1$ make the conventional low-pass filter at the current-sense input of a control circuit. When control signals are $OUT_1=1$ and $OUT_2=0$, the current-sense voltage is determined as $$V_{CS} = \frac{R_1}{R_1+R_3} \cdot R_{CS}I_{SW} + \frac{R_3}{R_1+R_3} \cdot V_{CC}. \quad (4)$$

Eq. (4) can be rewritten as $$V_{CS} = \frac{R_1}{R_1+R_3} \cdot \left( R_{CS}I_{SW} + \frac{R_3}{R_1} \cdot V_{CC} \right) \approx R_{CS}I_{SW} + \frac{R_3}{R_1} \cdot V_{CC}, \quad (5)$$

because $R_3 \ll R_1$. The second term in Eq. (5) represents the dc bias of the current-sense voltage. Finally, when both control signals are HIGH, i.e., $OUT_1=1$ and $OUT_2=1$, the current-sense voltage is determined as $$V_{CS} = \frac{R_1 \| R_2}{R_1 \| R_2 + R_3} \cdot \left( R_{CS}I_{SW} + \frac{R_3}{R_1 \| R_2} \cdot V_{CC} \right) \approx R_{CS}I_{SW} + \frac{R_3}{R_1 \| R_2} \cdot V_{CC}. \quad (6)$$

It should be noted that the dc bias of the current-sense voltage in Eq. (6) is larger than that in Eq. (5).

Figure 8:
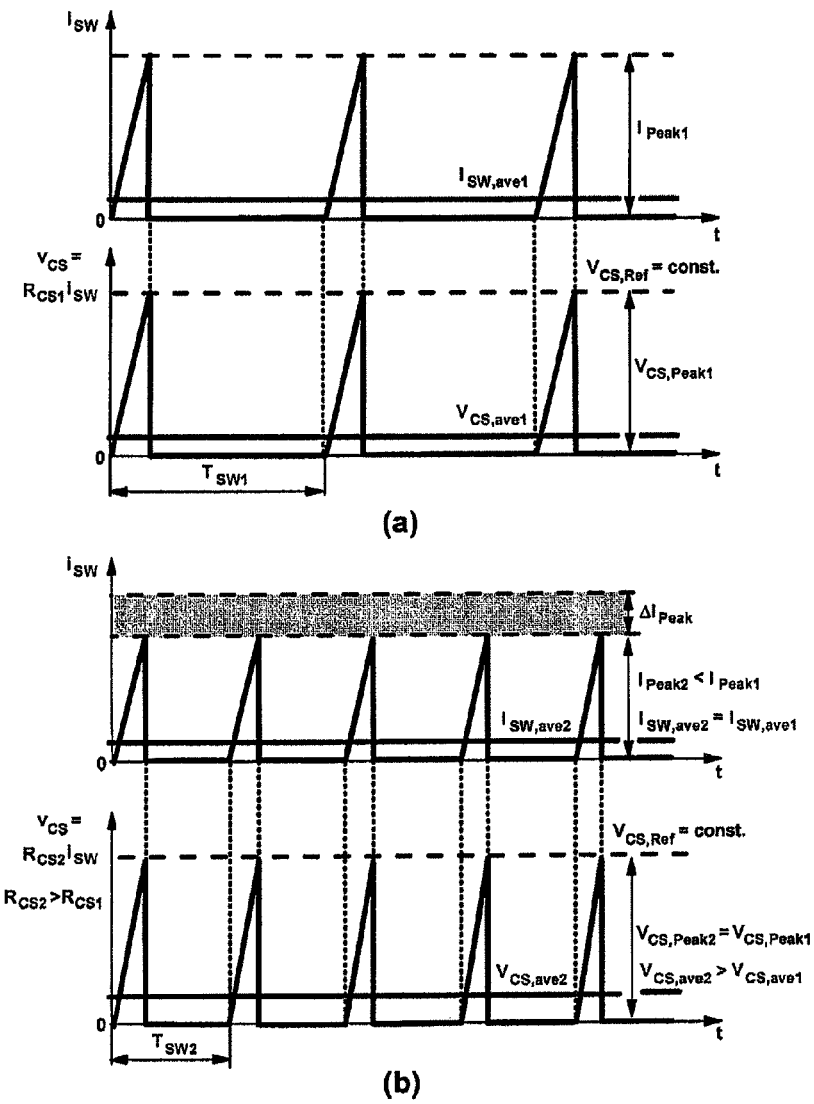
FIGS. 8 (a) and b) show various operating waveforms of the power supply of the invention according to yet another audible noise reduction embodiment.
Figure 22:
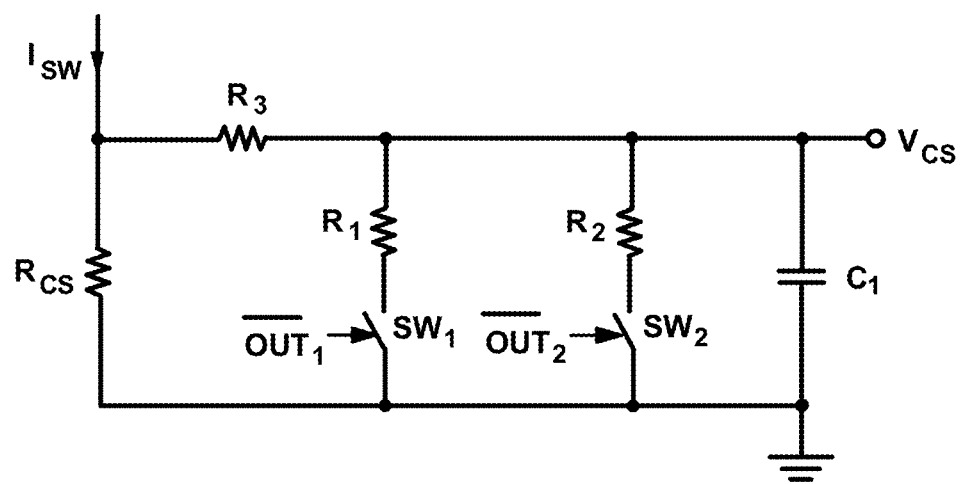
FIG. 22 shows yet another circuit embodiment for decreasing the peak value of the main switch current pulses.

FIG. 22 shows yet another implementation of the peak-current programming block in FIGS. 4, 11 and 12 according to Table I and according to FIG. 8, where the peak value of the main switch current pulses is decreased by effectively increasing the value of the current-sense resistor. The peak-current programming block receives control signals from the first and third block of the ANR circuit. The output $v_{CS}$ of the peak-current programming block is coupled to the current-sense voltage input, $v_{CS}$, of the comparator of the controller. When both control signals are LOW ($OUT_1=0$ and $OUT_2=0$), which corresponds to the maximum peak value of the switch current pulses, $I_{Peak1}$, both switches $SW_1$ and $SW_2$ are closed and, therefore, current-sense voltage $$V_{CS} = \frac{R_1 \| R_2}{R_1 \| R_2 + R_3} \cdot I_{SW} R_{CS} \quad (7)$$

is smaller than the voltage across the current-sense resistor. The effective current-sense resistor in Eq. (7) is determined as $$R_{CS,eff}(I_{Peak1}) = \frac{R_1 \| R_2}{R_1 \| R_2 + R_3} \cdot R_{CS}. \quad (8)$$

When the control signals are $OUT_1=1$ and $OUT_2=0$, which corresponds to the second peak value of the main switch current pulses, $I_{Peak2}$, only $SW_2$ is closed and, therefore, current-sense voltage is obtained as $$V_{CS} = \frac{R_2}{R_2 + R_3} \cdot I_{SW} R_{CS}. \quad (9)$$

The effective current-sense resistor in Eq. (9) is determined as $$R_{CS,eff}(I_{Peak2}) = \frac{R_2}{R_2 + R_3} \cdot R_{CS}. \quad (10)$$

The effective current-sense resistor in Eq. (10) is larger than that in Eq. (8). Finally, when both control signals are HIGH ($OUT_1=1$ and $OUT_2=1$), which corresponds to the minimum peak value of the main switch current pulses, $I_{Peak3}$, both switches $SW_1$ and $SW_2$ are open and, therefore, the current-sense voltage is equal to the voltage across the current-sense resistor, i.e., $$V_{CS} = I_{SW} R_{CS}. \quad (11)$$

It follows from Eqs. (11), (10), and (8) that $$R_{CS,eff}(I_{Peak3}) = R_{CS} > R_{CS,eff}(I_{Peak2}) > R_{CS,eff}(I_{Peak1}). \quad (12)$$

Figure 23:
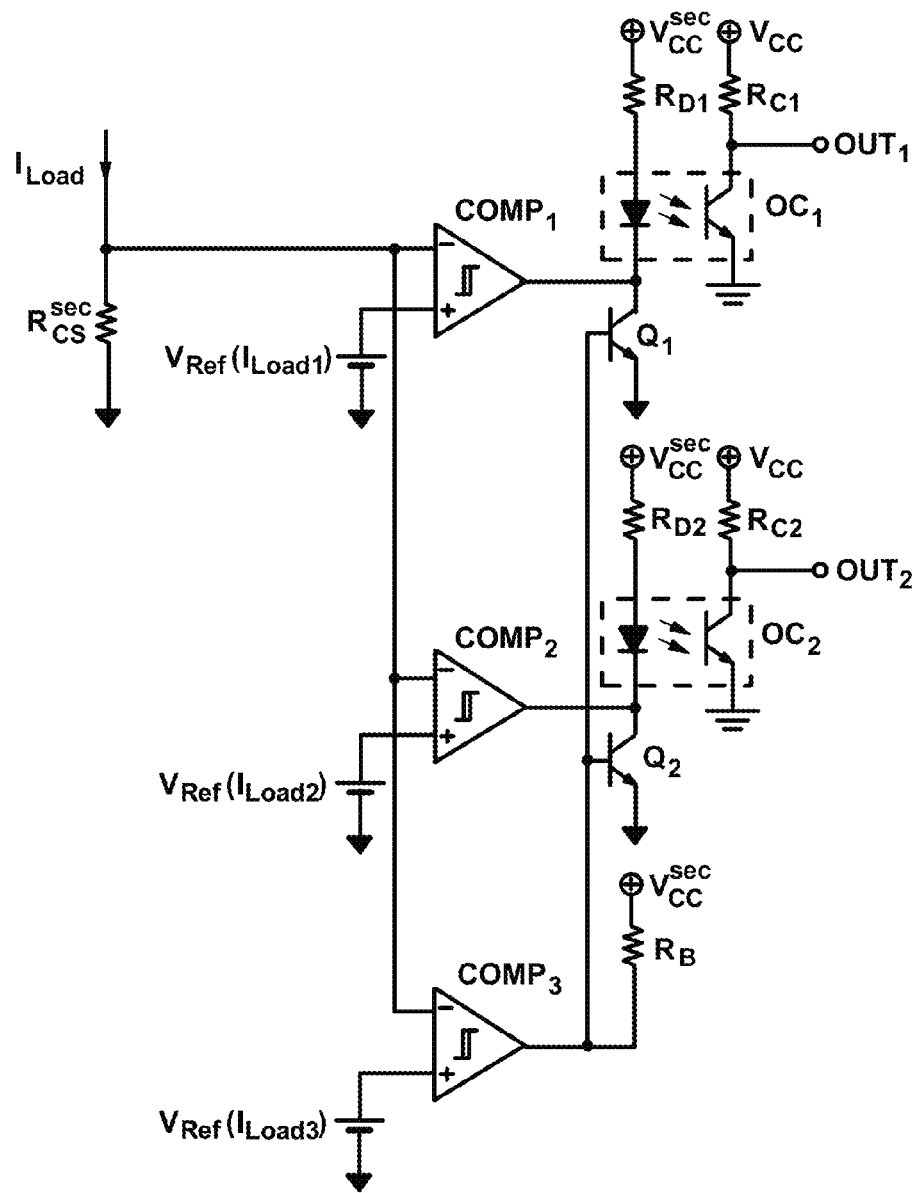
FIG. 23 shows one implementation according to the embodiment of the present invention presented in FIG. 11.
Figure 24:
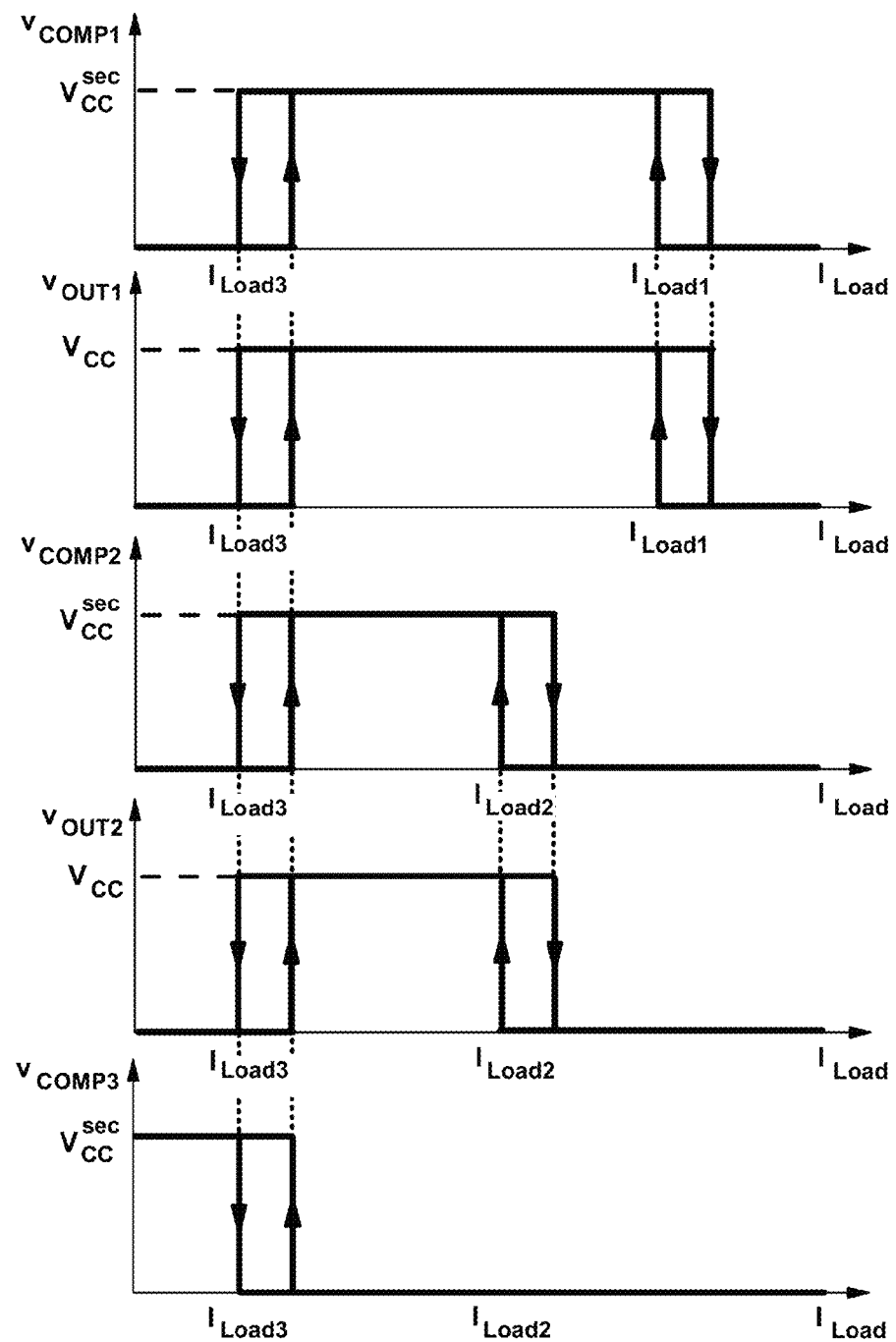
FIG. 24 shows principle of operation of the circuit in FIG. 23.

FIG. 23 shows one implementation according to the embodiment presented in FIG. 11, where the switching frequency is indirectly monitored by monitoring the load current. Principle of operation of the circuit in FIG. 23 is presented in FIG. 24.

The output signals $OUT_1$ and $OUT_2$ of the circuit in FIG. 23 control the peak value of the main switch current pulses as defined in Table I.

As long as the load current is larger than $I_{Load1}$ (shown in FIG. 10), the output voltage of all three comparators is LOW and the light-emitting diodes (LEDs) of opto-couplers $OC_1$ and $OC_2$ conduct. Therefore, both output signals are LOW, i.e., $OUT_1=0$ and $OUT_2=0$, and $I_{Peak}=I_{Peak1}$. When the load current decreases to $I_{Load1}$, the output voltage of comparator $COMP_1$ becomes HIGH, the LED of opto-coupler $OC_1$ stops to conduct, resulting in $OUT_1=1$. With $OUT_1=1$ and $OUT_2=0$, the peak value of the main switch current pulses decreases from $I_{Peak1}$ to $I_{Peak2}$. When the load current decreases to $I_{Load2}$ (shown in FIG. 10), the output voltage of comparator $COMP_2$ also becomes HIGH, the LED of opto-coupler $OC_2$ stops to conduct, resulting in $OUT_2=1$. With $OUT_1=1$ and $OUT_2=1$, the peak value of the main switch current pulses decreases from $I_{Peak2}$ to $I_{Peak3}$. When the load current decreases to $I_{Load3}$ (shown in FIG. 10), the output voltage of comparator $COMP_S$ becomes HIGH, switches $Q_1$ and $Q_2$ conduct and pull down the output of comparators $COMP_1$ and $COMP_2$ to LOW level. Consequently, both output signals become LOW, i.e., $OUT_1=0$ and $OUT_2=0$, and $I_{Peak}=I_{Peak1}$.

When the load current increases from below $I_{Load3}$ to above $I_{Load1}$, the operation of the circuit in FIG. 23 is similar to the operation described above just in the opposite direction.

It should be noted that references voltages $V_{Ref}(I_{Load1})$, $V_{Ref}(I_{Load2})$, and $V_{Ref}(I_{Load3})$, which correspond to load currents $I_{Load1}$, $I_{Load2}$, and $I_{Load3}$, respectively, are constant when the input voltage is constant. When the input voltage is variable, these references voltages vary inversely proportionally to the input voltage.

Figure 25:
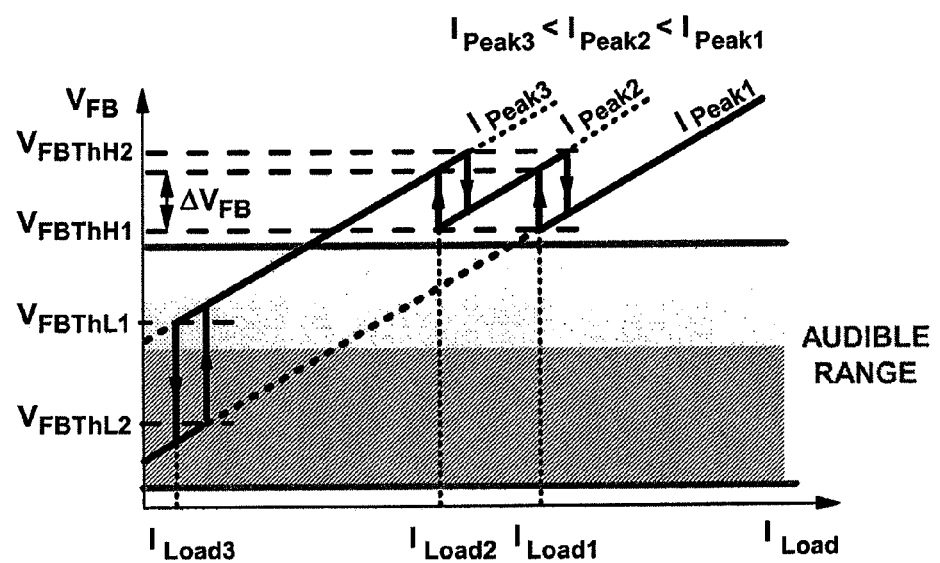
FIG. 25 shows the method of the present invention for the audible noise reduction presented in FIG. 12 when the switching frequency is monitored indirectly by monitoring the feedback voltage.

FIG. 25 presents one implementation method according to the embodiment presented in FIG. 12. The implementation method is obtained from the method presented in FIG. 10 by replacing the switching frequency with the feedback voltage because the feedback voltage is proportional to the switching frequency. The implementation according to the method presented in FIG. 25 is similar to the implementation presented in FIG. 13.

It will be understood that the above description of the present invention is susceptible to various modifications, changes and adaptations, and that the same are intended to be comprehended within the meaning and range of equivalents of the appended claims.

The invention claimed is:

1. A power supply that provides output voltage to a load comprising:
 a power converter coupled to the load, said power converter having at least one switch that is operated at a variable switching frequency that decreases towards an audible frequency range as the load decreases; and
 an audible noise reduction circuit that modifies said variable switching frequency of said power converter to reduce audible noise when said variable switching frequency is inside the audible frequency range.

2. The power supply of claim 1, wherein said variable switching frequency is initially inside the audible frequency range when the load decreases below a first level, and wherein the audible noise reduction circuit is configured to operate by increasing the variable switching frequency above a top threshold of the audible frequency range when the load is between said first level and a second level smaller than the first level.

3. The power supply of claim 2, wherein the audible noise reduction circuit is configured to operate by increasing the variable switching frequency to an upper part of the audible frequency range that is below the top threshold of the audible frequency range when the load is between said second level and a third level smaller than the second level.

4. The power supply of claim 3, wherein the audible noise reduction circuit is configured to operate by decreasing the variable switching frequency to a lower part of the audible frequency range that is above a bottom threshold of the audible frequency range when the load is below said third level.

5. The power supply of claim 2, wherein current pulses are produced through the at least one switch in accordance with the variable switching frequency, and wherein the audible noise reduction circuit, when the load is between said first level and said second level, in order to increase said variable switching frequency above the top threshold of the audible frequency range, reduces the peak value of the current pulses in one or more discrete steps so that in response to a decreasing load, every time the switching frequency decreases to the top threshold of the audible frequency range, the peak value of the current pulses is reduced by one step, resulting in an increase of said variable switching frequency in a discrete step above the top threshold of the audible frequency range.

6. The power supply of claim 3, wherein current pulses are produced through the at least one switch in accordance with the variable switching frequency, and wherein the audible noise reduction circuit, when the load is between said second level and said third level, in order to increase said variable switching frequency to be inside said upper part of the audible frequency range that is below the top threshold of the audible frequency range, reduces the peak value of the current pulses to a minimum level, so that the resulting audible noise is lower than a maximum acceptable level.

7. The power supply of claim 4, wherein current pulses are produced through the at least one switch in accordance with the variable switching frequency, and wherein the audible noise reduction circuit, when the load is below said third level, in order to decrease the variable switching frequency to a lower part of the audible frequency range that is above the bottom threshold of the audible frequency range, increases the peak value of the current pulses.

8. The power supply of claim 5, wherein the audible noise reduction circuit changes the peak value of current pulses based on monitoring a switch drive signal for the at least one switch, or monitoring a load current, or monitoring a feedback voltage.

9. The power supply of claim 6, wherein the audible noise reduction circuit changes the peak value of current pulses based on monitoring a switch drive signal for the at least one switch, or monitoring a load current, or monitoring a feedback voltage.

10. The power supply of claim 7, wherein the audible noise reduction circuit changes the peak value of current pulses based on monitoring a switch drive signal for the at least one switch, or monitoring a load current, or monitoring a feedback voltage.

11. The power supply of claim 8, further comprising a controller that regulates the output voltage by controlling said variable switching frequency based on a feedback signal coupled to the load, said controller comprising at least one of an error amplifier, a voltage-controlled oscillator, a comparator, a current sense resistor, and a switch timing and drive circuit, said comparator comparing a current sense voltage developed across the current sense resistor by the switch current pulses with a current-sense reference voltage.

12. The power supply of claim 11, wherein the peak value of the current pulses is changed by adjusting at least one of current-sense reference voltage, current-sense voltage, or current-sense resistor.

13. The power supply of claim 9, further comprising a controller that regulates the output voltage by controlling said variable switching frequency based on a feedback signal coupled to the load, said controller comprising at least one of an error amplifier, a voltage-controlled oscillator, a comparator, a current sense resistor, and a switch timing and drive circuit, said comparator comparing a current sense voltage developed across the current sense resistor by the switch current pulses with a current-sense reference voltage.

14. The power supply of claim 13 wherein the peak value of the current pulses is changed by adjusting at least one of current-sense reference voltage, current-sense voltage, or current-sense resistor.

15. The power supply of claim 10, further comprising a controller that regulates the output voltage by controlling said variable switching frequency based on a feedback signal coupled to the load, said controller comprising at least one of an error amplifier, a voltage-controlled oscillator, a comparator, a current sense resistor, and a switch timing and drive circuit, said comparator comparing a current sense voltage developed across the current sense resistor by the switch current pulses with a current-sense reference voltage.

16. The power supply of claim 15, wherein the peak value of the current pulses is changed by adjusting at least one of current-sense reference voltage, current-sense voltage, or current-sense resistor.

17. The power supply of claim 1, wherein said power converter is at least one of:
   a forward converter;
   a half-bridge converter;
   a full-bridge converter;
   a flyback converter; or
   a boost converter.

* * * * *